(12) United States Patent
Gidwani

(10) Patent No.: US 7,733,822 B2
(45) Date of Patent: Jun. 8, 2010

(54) DISTRIBUTED DISPARATE WIRELESS SWITCHING NETWORK

(75) Inventor: Sanjay M. Gidwani, 18925 Mellon Dr., Saratoga, CA (US) 95070

(73) Assignee: Sanjay M. Gidwani, Saratoga, CA (US)

(*) Notice: Subject to any disclaimer, the term of this patent is extended or adjusted under 35 U.S.C. 154(b) by 1068 days.

(21) Appl. No.: 11/001,255

(22) Filed: Nov. 30, 2004

(65) Prior Publication Data
US 2006/0168111 A1 Jul. 27, 2006

(51) Int. Cl.
H04W 4/00 (2009.01)

(52) U.S. Cl. .................... 370/328; 455/416; 455/432.1; 455/436; 370/310

(58) Field of Classification Search ................ 455/411, 455/433, 436–444; 370/260, 261, 263, 264, 370/310, 328
See application file for complete search history.

(56) References Cited

U.S. PATENT DOCUMENTS

| | | | | |
|---|---|---|---|---|
| 5,546,382 | A * | 8/1996 | Fujino ........................ | 455/405 |
| 7,298,725 | B2 * | 11/2007 | Rune ......................... | 370/338 |
| 2003/0149772 | A1 * | 8/2003 | Hsu et al. ................... | 709/227 |
| 2004/0053629 | A1 * | 3/2004 | Rueger et al. ............... | 455/466 |
| 2004/0264410 | A1 * | 12/2004 | Sagi et al. .................. | 370/331 |
| 2005/0079869 | A1 * | 4/2005 | Khalil et al. ............. | 455/435.1 |
| 2005/0239498 | A1 * | 10/2005 | Dorenbosch et al. ..... | 455/552.1 |

FOREIGN PATENT DOCUMENTS

| | | |
|---|---|---|
| EP | 1 043 906 A2 | 10/2000 |
| EP | 1 128 632 A2 | 8/2001 |
| WO | WO 02/13567 A1 | 2/2002 |
| WO | WO 02/43415 A2 | 5/2002 |

OTHER PUBLICATIONS

International PCT Search Report and Written Opinion, PCT/US2005/040685, Int'l. filing date: Nov. 8, 2005, mailing date: Apr. 3, 2006. (12 pgs.).
PCT/US2005/040685, "Notification Concerning Transmittal of International Preliminary Report on Patentability (Chapter I of the Patent Cooperation Treaty)", Jun. 14, 2007, 8pp.

* cited by examiner

*Primary Examiner*—Nghi H Ly
*Assistant Examiner*—Amancio Gonzalez
(74) *Attorney, Agent, or Firm*—Blakely, Sokoloff, Taylor & Zafman LLP

(57) ABSTRACT

A distributed disparate wireless switching network is described herein. In one embodiment, an exemplary network architecture includes, but is not limited to, a connection origination exchange (COX), a proxy controller coupled to the COX, an access point coupled to the proxy controller, and a mobile node wirelessly coupled to the access point. The mobile node communicates with a terminating node of a network through the access point and the proxy controller using an identification maintained by the proxy controller. The COX originates a connection with the terminating node on behalf of the mobile node using the identification provided by the proxy controller. Other methods and apparatuses are also described.

16 Claims, 11 Drawing Sheets

DISTRIBUTED DISPARATE WIRELESS SWITCHING NETWORK

FIELD OF THE INVENTION

The present invention relates generally to wireless networks. More particularly, this invention relates to a distributed disparate wireless switching network.

BACKGROUND OF THE INVENTION

Wireless communication has become pervasive over the last couple of decades. Specifically, cellular networks have become ubiquitous both within the United States as well as internationally. Recent advances in Wireless Fidelity (WiFi) and WiMax are further receiving much attention for data communications within wireless local area network (WLAN). Increasingly, WLAN technologies are becoming capable of providing high bandwidth services and adequate quality of service for multi-service communications, such as voice, video and data.

WLAN penetration within the enterprises and small and medium businesses (SMB) promises to significantly improve workforce productivity. Present architectures for data and voice communications are inadequate to provide true workforce mobilization within the enterprises and SMBs. The cellular architecture in the form of second generation (2G), third generation (3G), and the forthcoming fourth generation (4G) architectures are commonplace and provide limited mobility management infrastructure.

However, such architectures are generally private to the operating carrier, and no access is available for external agencies to the carrier's network for comprehensive device mobility management. The general reluctance of the wireless carriers in opening up their private mobility management solutions to the public is rooted in the business need for the carriers to maintain control over the subscribers within their networks.

On the other hand, the subscriber's preference is to carry a single mobile device for comprehensive communications with custom mobility management capabilities and is in direct odds with the business needs of the carrier. The convergence of wireless local area networks and cellular wireless networks further highlights the competing interests of the subscriber and the service provider.

An advanced technique for comprehensive mobility management under the control of the subscriber is needed to provide true workforce mobilization and advanced services within the enterprise, SMBs and subscribers in general.

SUMMARY OF THE INVENTION

A distributed disparate wireless switching network is described herein. In one embodiment, exemplary network architecture includes, but is not limited to, a connection origination exchange (COX), a proxy controller coupled to the COX, an access point coupled to the proxy controller, and a mobile node wirelessly coupled to the access point. The mobile node communicates with a terminating node of a network through the access point and the proxy controller using an identification maintained by the proxy controller. The COX originates a connection with the terminating node on behalf of the mobile node using the identification provided by the proxy controller.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
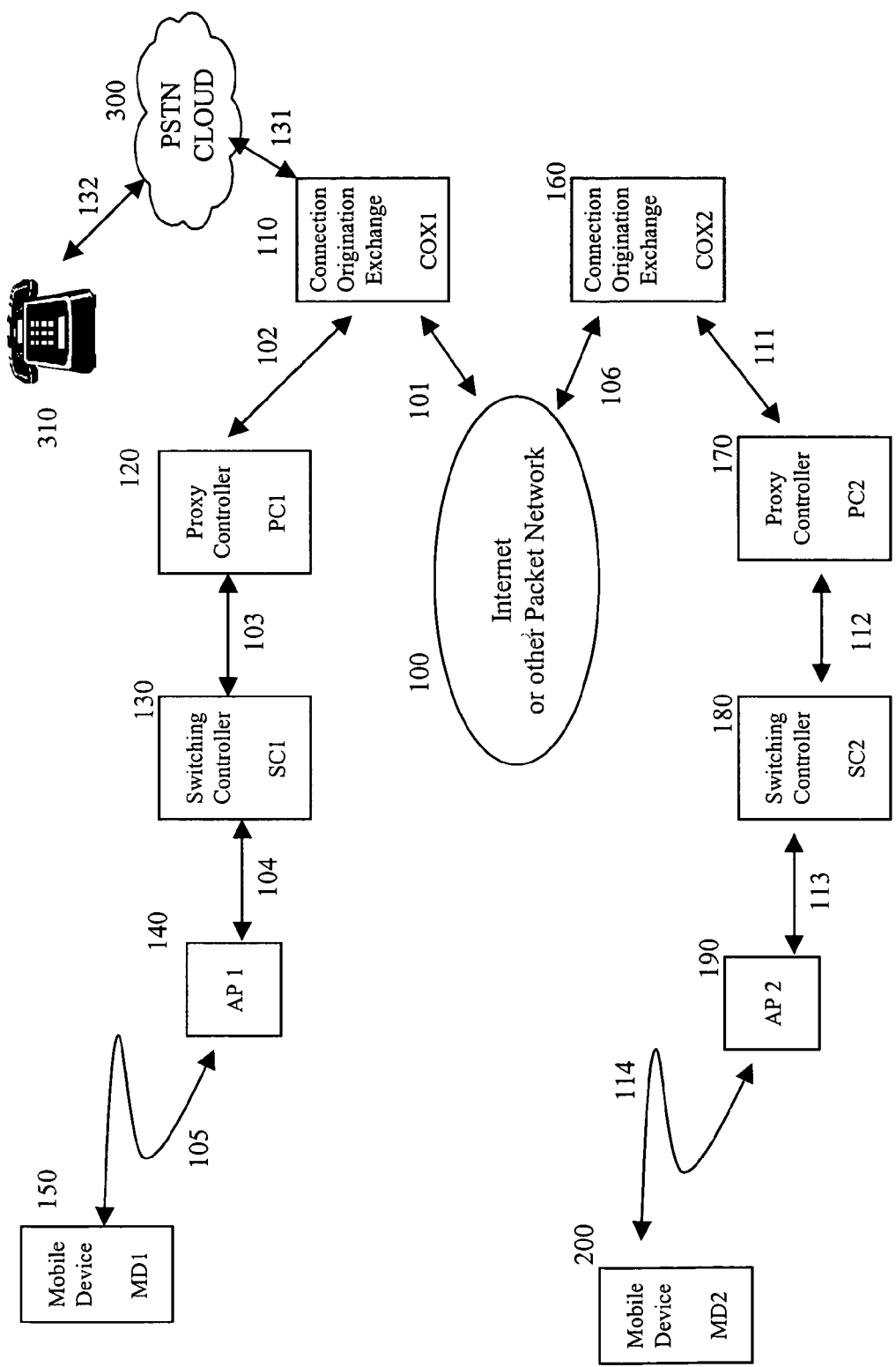
FIG. 1 is a block diagram illustrating an exemplary distributed disparate wireless switching network according to one embodiment.

A distributed disparate wireless switching network is described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The present invention relates to an apparatus and method for a distributed disparate wireless switching network. In one embodiment, a switching controller is enabled as a physical device or as a virtual distributed functionality. The switching controller has the ability to communicate with one or more mobile devices within the network and to cooperate with one or more disparate wireless and wireline networks in establishing command, control and communication with the mobile devices.

According to one embodiment of the invention, the switching controller includes a single chassis or multi chassis resident in a centralized location, capable of and with access to one or more distributed mobile devices either directly or indirectly. The mobile devices may be located or collocated either with the centralized controller or they may be distributed across a large network that is physically segregated from the central location. The mobile devices have the capability of connecting to one or more wireless and wireline networks. The wireless and wireline networks utilize one or more disparate access technologies. The mobile devices can be either portable in nature such as a cellular phone or a personal digital assistants (PDA's), laptops or they may be semi-portable as a desktop computer or a desktop telephone. The distributed switching controller aggregates one or more mobile devices and provides a mechanism for distributed mobility management under the control of the subscriber.

According to one embodiment of the invention, the switching controller may include disparate multiple chassis, where the switching controller functionality is provided in a cooperative virtual distributed manner. The functionality of the switching controller may be achieved with one or more switching controllers, with one or more disparate operational units such as computers and mobile devices or else with a combination of both switching controllers and disparate operational units. According to one embodiment of the invention, the switching controller includes a single or multi chassis, incorporating one or more processing functions that deliver the processes and control functionality to the mobile devices on an as needed basis. Furthermore, the switching controller is aware of the local wireless and wireline traffic at one or more communication nodes such as access points and base stations to provide comprehensive switching functionality.

In one embodiment, the switching controller communicates with one or more communication infrastructure nodes such as access points and base stations. The access points and base stations can be distributed across a wide area network. According to one embodiment of the invention, the switching controller has the capability of communicating and affecting the functionality of these communication nodes. The switching controller further has the capability of communicating with one or more communication nodes within one or more large networks and providing location based and subscriber based information to additional upstream switching controllers and communication nodes. In one embodiment, one or more switching controllers may be interconnected to provide a distributed scalable network for a service provider.

An embodiment of the invention further provides for a method of interconnection of switching controller with one or more access points and base stations utilizing one or more network interfaces modules (NIMs) for operation across disparate wireless networks such as WiFi, WiMax, GSM, and CDMA, among others. Both the switching controller and the NIMs may be within the same physical network or segregated across multiple networks.

An embodiment of the invention further provides for a means and method for communication between the switching controllers, the mobile devices and one or more wireless and wireline networks such that information can be passed across the system and intelligent decisions can be made regarding the topology of the network with regard to the immediate conditions of one or more network parameters. The information regarding the one or more parameters can be used to make intelligent decisions regarding service preferences, traffic policies, quality of service, and other performance and service related parameters including preferred carrier, location based network selection, quality and congestion based network selection, among other things, within the distributed switching wireless network.

One of the enabling capabilities of the present invention is the ability of delivering one or more access methodologies for the subscriber under the control of the subscriber, wherein a selected access and roaming policy will be established based on a subscriber's profile, the application profile, or the combination thereof.

As discussed more fully below, the use of the present invention allows for many features and functions and delivers several advantages when utilized within one or more wireless and wireline networks.

Having described a preferred embodiment of the invention it is noted that modifications and variations can be made by persons skilled in the art in light of the above teachings. It is therefore to be understood that changes may be made in the particular embodiments of the invention disclosed which are within the scope and spirit of the invention as outlined by the claims. Having thus described the invention with the details and particularity required by the patent laws, what is claimed and desired protected by letters patent is set forth in the claims.

One of the innovative characteristics of the present invention is that it incorporates the mechanism of providing both wired and wireless mobility. Whereas traditional solutions generally provide the ability of utilizing over the air network interfaces in the form of wireless technologies such as cellular communication. Embodiments of the present invention introduce the notion of wired mobility in that a mobile device is able to communicate using an over the air network to a wired network and the mobile device further has the mechanisms to communicate to the switching controller. The switching controller in cooperation with the proxy controller provides the functionality to register the mobile device and to cooperate with other distributed switching controllers to establish the policy and control associated with the mobile device. The present invention further provides the mechanisms for the switching controller to establish a connection between the switching controller and a proxy controller. The proxy controller may include one or one or more switching controllers cooperating in order to provide the proxy service. Proxy service is the notion of the incoming calls having the local physical characteristics of the localized mobile device and the outgoing characteristics that are transparent to the localization. Each proxy controller has the mechanisms of supporting one or more incoming and outgoing connections. The connections may be either originated from an over the air interface such as a mobile device initiating the call flow, or the connections can be originated from the wired network interface, such as a incoming landline connection such as an incoming FXO, T1 PRI connection, or an internet or private network based digital connection such as a Voice over IP connection over a private IP network.

This approach is advantageous in comparison to traditional wired solutions in that the receiving party at the terminating end of the connection sees a unique identifier associated with the subscriber regardless of where the connection was originated. In an exemplary call flow a remote in-field employee can originate a connection from a remote location, but the unique identifier received by the receiving station is the virtual proxy subscriber number and remains substantially the same regardless of the mode of local access.

Wireless local area networks are fast becoming ubiquitous and users are continuing to increasingly desire the ability to make voice over IP calls and other data connectivity and voice connectivity connections. The subscribers are further desiring the ability to make the connection from transitory and foreign locations based on one or more mobility requirements. One of the obstacles for enabling such open access for visitors to the foreign sites is the uncertain nature of the billing and subscriber management. Specifically, the billing and bandwidth associated with certain connections may require differential billing for the transaction, while similar calls with lower bandwidth requirements may have a lower pricing and alternative billings. The virtual proxy subscriber number not only provides a unique identifier to the receiving party for easy identification, but it also establishes a single accounting metric in terms of billing and subscriber management.

The architecture of one embodiment of the present invention provides the mechanism for a connection origination to be virtualized by use of an exchange switch. In such an embodiment, the originating station would request a connection to be made to the termination station. The distributed wireless network of the present invention would interrogate the originating station and initiate an originating segment connection between the originating station and the elected connection origination exchange. The connection origination exchange would in-turn initiate a second path between the originating station and the terminating station. Furthermore, in an exemplary embodiment of the invention, the connection origination exchange could in-turn initiate a second segment between the originating station and a secondary elected connection origination exchange associated with the termination station. The secondary elected connection origination exchange in-turn initiates a third connection segment between the secondary origination exchange and the terminating station. One of the innovative characteristics of the present invention is that the primary connection origination exchange manages the mobility on behalf of the originating station. A secondary connection origination exchange may manage the mobility on behalf of the terminating station.

In one embodiment of the present invention the primary connection origination exchange may incorporate the functionality of the proxy controller. In another embodiment of the invention the secondary connection origination exchange may further incorporate the functionality of the proxy controller. In another embodiment of the invention both the primary and the secondary connection origination exchanges may be the same connection origination exchange.

In one exemplary embodiment of the invention, the originating station may have a local dynamic identifier while originating the connection to the connection origination exchange. Once a connection to the connection origination exchange is established, the originating station may forward yet another dynamic authentication token to the connection origination exchange. The authentication token may include a dynamic identifier computed based on a prior secure exchange. The computation of the prior secure exchange is such that based on the originating stations transmission of the request for origination, the dynamic authentication token, and other dynamic parameters, such as location, local dynamic identifiers, terminating stations identifiers, among others, the primary connection origination exchange is able to uniquely authenticate the originating station.

One of the innovative characteristics of the present invention is that the connection origination exchange has the means and mechanisms to cooperate with one or more connection origination exchanges in managing the requirements of the mobile devices. In one embodiment of the invention mobility management is achieved by segregating the identification of the origination station by use of local scope and the virtual scope. In a virtual scope, a virtual attribute such as a telephone number is associated with a subscriber's account. Furthermore, the subscriber's account is authorized to have one or more participants within each given connection. Participants of the subscriber's account may be one or more redundant segments from the connection origination exchange to the originating subscriber. The mobility management functionality of the connection origination exchange cooperates with one or more other devices to identify the active participants within a connection.

In an exemplary embodiment, the subscriber may elect to establish a connection to the connection origination exchange from a one of one or more different WiFi access points. At the initiation of the connection the subscriber, due to its physical proximity, may elect to connect to the connection origination exchange by use of a WiFi access point AP1. Once the originating station has entered the range of AP1 and the mobile device has been detected by the AP1 the mobile device may elect to register with the access point. The initiation of the registration process may be based on a mobile device's detection of a new access point within it's range, or it may be based on a time-to-time based broadcast of registration, or alternatively, it may be based in the access point's identification of the mobile device within its range. All initial registrations are deemed to be remote registrations, in that the subscriber is expected to be a temporary participant in all originating or terminating connections. Upon receiving a remote registration request, the receiving access point or base station originates an authentication request to its connection origination exchanges. The access point or base station's connection originating exchange cooperates with one or more other connection origination exchanges to authenticate the requesting mobile device. The access point or base station's proxy controller returns a verdict to either reject the requesting station, classify the requesting station to be a deemed a remote registration or otherwise classify the requesting station to be a master registration. A master registration requires the connection origination exchange to also serve as the manager of the connection recording, connection billing and device management of the subscriber device. A remote registration requires the connection origination exchange to request from a master registration's connection origination exchange to identify the requesting station's preference and accounting information.

The connection origination exchange cooperates with one or more other connection origination exchanges to maintain a database of frequent shared remote subscribers. Upon receiving a registration message from the remote station the remote connection origination exchange maintains a record of the remote registration and also forwards the information to the master registration connection origination exchange. A given connection origination exchange is associated with one or more access points and base stations. Upon receiving a remote registration request, the remote connection origination exchange further maintains a record of the access point associated with the mobile station. The remote connection origination exchange elects in cooperation with the master connection origination exchange to not forward the access point association with the remote station. The association of a mobile device with the master registration server may be changed based on the dynamic nature of the mobile device.

In one embodiment, the switching controller or the connection origination exchange may have integrated with wireless backhaul capability. In such an exemplary embodiment, the switching controller or the connection origination exchange has the mechanisms to directly communicate with a wireless service provider's mobile switching center (MSC), the base switching controller (BSC), and other components of the wireless service provider's wireless network. In one exemplary topology, according to one embodiment, the subscriber elects to use WiFi as the access technology of choices between the mobile device and the proxy controller and the connection origination exchange. The switching controller is connected to the connection origination exchange with a wired or wireless connection, and the connection origination exchange is connected to a wireless service provider utilizing a fixed wireless technology such as Wimax. In another embodiment, the interconnection wireless technology is elected to be cellular wireless. In another embodiment, the interconnection wireless technology is elected to be a wired interconnection to a wireless service provider. In yet another embodiment, the interconnection technology is elected to be wired interconnection to a wired service provider or an Internet service provider.

Embodiments of the invention incorporate the mechanism of associating a connection identifier with a given connection origination. The network has the mechanisms to continue to maintain a connection originated by a given subscriber even in a case of a loss of signal from the mobile device. Such a mechanism is advantageous in that if the mobile device is temporarily out of service, the connection is not lost and does not need to be re-originated. In extreme cases where the loss of signal is longer than a predetermined, programmable interval, the connection is finally terminated by the connection origination exchange after a time-out period. In an exemplary operational scenario, according to one embodiment, the mobile device has the mechanisms to communicate with one or more access points or base stations. In such an exemplary scenario, the call origination exchange may elect to maintain one or more connections between one or more connection paths from the mobile device to the connection origination exchange. In an exemplary case of two access points, the call origination exchange will bind all the origination streams to both the access points into a single connection. The connection origination exchange may elect to use a simple conferencing capability, or may elect to use an activity detection mechanism, or may elect to use signal strength mechanism, or alternatively elect to use a predictive next likely connection mechanism for selecting the active participant from the origination bundle.

Connection persistence technology is advantageous in that if during the hand-off between the first access point or base station and the next access point or base station, the signal is lost on a temporary basis, the connection to the terminating station is not lost but rather persists in cooperation with the connection origination exchange. The connection origination exchange may elect to notify the terminating station by using an identified tone, music or alternative sound schemes to alert the terminating station of the temporary loss of the originating station.

In one embodiment, the switching controller has the ability of communicating with one or more mobile devices within a local wireless network utilizing disparate wireless technologies. Furthermore, the switching controller has the capability of serving as proxy controller functionality. In such an exemplary scenario, the functionality of the switching controller and the proxy controller may be comprised in a single chassis or multiple chassis resident in a centralized location or within multiple chassis distributed in a functionally equivalent manner. The functionality of the proxy controller is to provide the resources and transparency on behalf of the subscriber to buffer the localized characteristics of the access wireless technology from the network access. The proxy controller provides a unified messaging and communications interface to a private or public network. The present invention provides the means and mechanisms for an embodiment wherein the subscriber side transparency to the mobile devices is in the form of the switching controller functionality and the network side transparency of the switching controllers to the network is in the form of the proxy controller and are consolidated within a single chassis or within multiple distributed functional equivalent.

In yet another embodiment, the functionality of the connection origination exchange may further be consolidated with the switching controller and the proxy controller. In such an embodiment, the connection origination session is originated from a single chassis or multiple distributed chassis. As the mobile device exits the range of the consolidated controller, the connection origination continues to be maintained by the original consolidated controller. In the scenario wherein the mobile device transverses to another consolidated controller, both the connection origination functionality and the proxy controller functionality continues to be maintained by the original consolidated controller however the switching controller functionality is provided by the new consolidated controller.

The consolidated controller is advantageous in that the distributed wireless switching network becomes highly scalable. In an exemplary scenario, a low port density device can be mass-produced to provide the consolidated controller functionality. The low port density device provides a cost-effective distributed means for building out a scalable disparate wireless network.

Traditional notion of signaling within both wireless and wireline technology is to establish a connection and then at a later time to tear down a connection. No means of moving the connection with any degree of persistence exists within the traditional signaling technologies. Embodiments of the present invention introduce a notion of re-transportation of a connection wherein the connection origination exchange maintains a connection with a terminating device while it sets up a new alternative originating connection to a new originating pathway. Once a new origination pathway is established, the connection origination exchange activates the new pathway and then finally tears down the old existing originating connection.

The re-transportation of the connection origination is advantageous in that a connection can persist even in the case of a temporary loss of contact with the originating station. As the range of wireless cells continues to decrease in size, the traditional origination based signaling methodologies become increasingly inadequate. The re-transportation of connection origination is further advantageous in that the signaling is limited within the local scope between the originating station and the connection origination exchange. Network wide signaling takes place from the connection origination exchange to the terminating station, while the signaling from the connection origination exchange to the originating station has local signaling scope.

In certain embodiments, the network incorporates the mechanisms for the functionalities and notion of a proxy address, a proxy path and proxy path segmentation. In such an embodiment, a given mobile node may either elect to establish a connection with a terminating station, or may receive a request to connect from an originating station. In the scenario where the given mobile node is originating the connection, it may elect to use a proxy address. A proxy address is a virtual address for establishing a connection with the terminating unit. Whereas mobile devices using disparate wireless technologies may elect to utilize one or more identification mechanisms, the proxy address provides a way for uniquely identifying the subscriber, rather than the device used for the connection. The subscriber may cooperate with the proxy controller to elect a forwarding mechanism based on the subscriber's preferences. The proxy controller is primarily responsible to provide a consistent network side interface for other network subscribers in accessing a connection with the subscriber. The notion of a proxy address is a unique identification mechanism used by the proxy controller so that other subscribers may connect to a given subscriber in a predictable manner. The proxy address is also associated with the subscriber's preferences, authentication, authorization, accounting and billing functions in order for the network operator to manage and bill the subscriber accordingly.

Embodiments of the present invention further introduce the notion of a proxy path. A proxy path is a sequence of interconnections required from the originating station to the connection origination exchange. In an exemplary wireless local area network scenario, the connection from the mobile device of the subscriber has to transverse one or more devices such as access points, switches, routers, and gateways, among others. A given route through one or more such devices is identified as a proxy path. One or more of proxy paths exist between the mobile device and the connection origination exchange. The proxy controller cooperates with the mobile device, and the connection origination exchange in selecting the specific proxy path used between the mobile device and the connection origination exchange.

A proxy path is composed of the mobile device connecting to one or more interconnection devices. These interconnection devices further connect to one or more other interconnection devices. The connections between the individual networking elements such as access points, routers, switches and gateways are considered segments of a given proxy path. Embodiments of the present invention provide ways for the proxy controller to elect to subdivide a given proxy path into a pluralities of segments, and elect to alter either in part or whole the segments within a given proxy path. Embodiments of the present invention provide ways for the proxy controller to utilize one or more wired and wireless networking protocols such as MPLS and Diffserv, among others, to reserve or select a given proxy path. Once a given path is selected, the proxy controller further has ways of path segmentation in that some or all of the segments of the elected proxy path may be altered based on the subscriber and the network requirements.

Embodiments of the present invention further provide ways of a virtual proxy subscriber number wherein the proxy address is associated with one or more subscribers rather than just a single subscriber. In such an exemplary scenario, a group of subscribers may be elected to participate in a given group associated with the virtual proxy subscriber number. The proxy controller may cooperate with one or more mobile devices and network management functions in order to elect the connection completion and the connection origination paths. Embodiments of the present invention further provide ways for creating a virtual proxy subscriber number and the associated subscriber group on a temporary or permanent basis. The virtual proxy subscriber number functionality is advantageous in establishing multi-party connections such as multi-media broadcast and multi-media conferences, among others. The virtual proxy subscriber number may also be utilized by the proxy controller to consolidate network management, account management, and billing functionalities. The virtual proxy subscriber number is further used by the proxy controller and the connection origination exchange to bind a group of subscribers in a logical group rather than a physical group, where given operations are on a group basis rather than individual subscriber number basis.

FIG. 1 is a block diagram illustrating an exemplary distributed disparate wireless switching network, according to one embodiment. As shown in FIG. 1, the system includes a number of components that are either physically co-located or physically distributed based upon a specific embodiment of the invention. A typical network includes of one or more devices MD1 (150) and MD2 (200) that require connections for exchanging information with each other. The devices may incorporate either wired or wireless interfaces that interconnect with other infrastructure components such as access points, base stations and routers. The originating and terminating devices generally have some mechanisms for interconnection utilizing either local area networks, wide area networks and the Internet (100).

Mobile device MD1 (150) may be one of the one or more mobile devices such as a cellular phone, a personal digital assistant, a pocket personal computer, or a laptop. Mobile device MD1 (150) may further utilize one or more medium interfaces such as WiFi, WiMax, Bluetooth, CDMA, TDMA, or GSM, among others. Based on the technologies deployed, the mobile device MD1 may interconnect with the access point or base station AP1 (140) using one or more wireless and wireline technologies through the interconnection pathway 105. In one embodiment of the invention, the interconnection pathway 105 may be WiFi. In such an embodiment, mobile device MD1 (150) incorporates a wireless fidelity (WiFi) interface and the access point AP1 (140) further incorporates a WiFi interface. As mobile device MD1 (150) enters the range of communication with AP1 (140), the mobile device may detect some activity on the wireless interface. Once such activity is detected, the mobile device may elect to initiate a communication session with the access point AP1 to register itself for interconnection. Alternatively, the mobile device MD1 (150) elects to initiate an attempt to communicate with potential access points within its range from time to time. In yet another embodiment, the access point broadcasts a request for all mobile devices to register with the access point from time to time. Upon receiving such a request, the mobile device elects to register itself with the access point based on its configuration.

Embodiments of the present invention provide the mechanisms, where the mobile device initiates communication with the proxy controller PC1 (120) across the interconnection network upon establishing an interconnection between the mobile device MD1 (150) and the access point AP1 (140). The interconnection network includes switches, routers and other infrastructure components within the local area network of the originating network, and includes at least one switching controller, one proxy controller, and one call origination exchange. In certain embodiments of the invention, one or more of these components may be integrated together based on specific deployment and scalability considerations.

FIG. 1 illustrates a switching controller SC1 (130) that interconnects with one or more disparate wireless access points and base stations such as AP1 (140). The primary functionality of the switching controller SC1 is to provide the subscriber access transparency while providing the flexibility for one or more access technologies such as WiMax, WiFi, 3G, among others. One of the advantages is in segmentation of the physical layer requirements of the disparate access methodologies from the subscriber management layers.

FIG. 1 further illustrates a proxy controller PC1 (120) that interconnects with one or more switching controllers. The primary functionality of the proxy controller is to provide the subscriber management transparency while providing the flexibility for multiple switching controllers and subscriber access methodologies. In one embodiment, the proxy controller aggregates the subscriber preferences, authentication, accounting, authorization and access. In another embodiment, the proxy controller provides a subscriber transparent network side interface for the call origination exchange COX1 (110). Segmentation of subscriber management provides the mechanisms, where a given connection is treated as a usage view of the subscriber onto the network. In such an embodiment, each disparate access technology has a unique view of the subscriber preferences, where based on the technology in use, the given subscriber management function may be rendered, while using other technologies a specific subscriber management function may not be rendered.

FIG. 1 further illustrates a connection origination exchange COX1 (110) that may interconnect with one or more proxy controllers. The primary functionality of the connection origination exchange is to provide a virtual subscriber presence within the network that is independent of the subscribers' access policies or mode of presence. In such an embodiment, the connection origination exchange initiates a connection on behalf of the mobile device MD1 (150) once the mobile device makes the request. The connection origination exchange further provides the presence management functionality once a connection has been established with a terminating station. The connection origination exchange also hosts one or more applications that the subscriber may require from time to time, such as firewalls, voicemail, storage and streaming. The call origination exchange is primarily responsible for managing the media stream between the originating mobile device and the terminating mobile device. The connection origination exchange provides virtualization of services.

FIG. 1 further illustrates the interconnection of the connection origination exchange COX1 (110) to the Internet via the interconnection pathway (101). COX1 (110) incorporates the mechanism for media translation such as a voice over IP gateways, where connection origination and connection termination may take place over TDM networks such as class 5 switch or a PBX, as well as voice over packet technologies such as VoIP and VoATM, among others. Certain embodiments of the invention provide direct connection between the connection origination exchange and legacy networks such as an operator's TDM or IP networks. In such an embodiment, the connection origination exchange initiates a voice call over traditional TDM networks such as T1s over the PSTN (300) infrastructure. Such an embodiment is advantageous in its ability to integrate within established legacy networks in a seamless manner. In an exemplary call flow, a voice call is initiated by the mobile device MD1 (150) and the call is originated by the connection origination exchange COX1 (110) using T1 with PRI signaling over the TDM interconnection pathway (131) and interfaces to the PSTN (300) network. The call is terminated to a PSTN subscriber telephone (310) over a TDM interconnection pathway (132).

Figure 2:
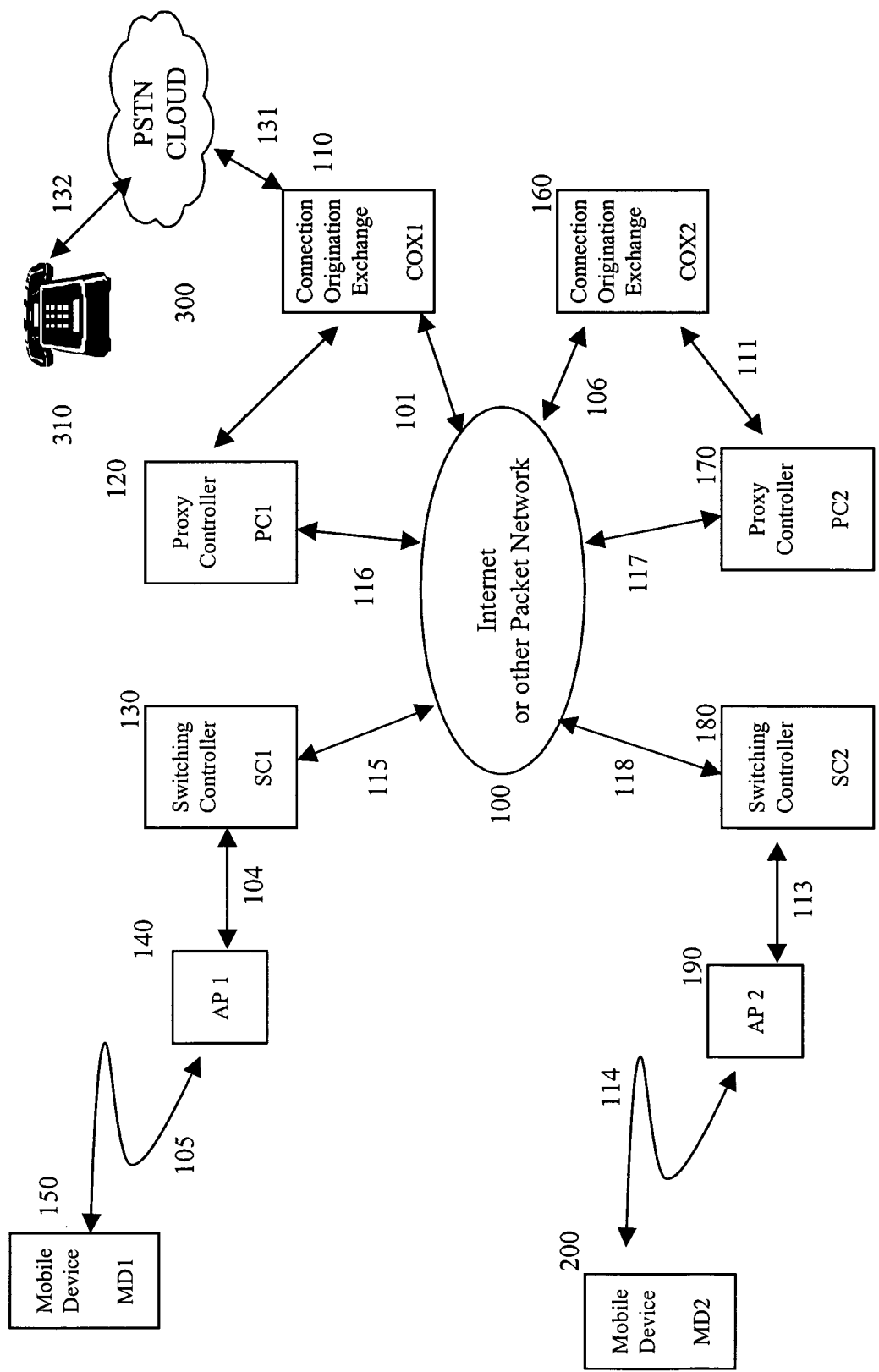
FIG. 2 is a block diagram illustrating an exemplary distributed disparate wireless switching network according to an alternative embodiment.

FIG. 2 is a block diagram illustrating an exemplary distributed disparate wireless switching network according to one embodiment of the present invention. As shown in FIG. 2, the system includes similar components as discussed and outlined in FIG. 1. The components may either be physically co-located or physically distributed from each other based upon the specific embodiment of the invention. The exemplary network of FIG. 2 includes one or more mobile devices MD1 (150) and MD2 (200), interconnection devices such as access points and base stations AP1 (140) and AP2 (190), and one or more switching controller SC1 (130) and SC2 (180). Certain embodiments of the invention co-locate these devices in proximity to each other. FIG. 2 illustrates an embodiment wherein the interconnection pathway (115) between the switching controller SC1 (130) transverses across a packetized network such as the Internet (100) or a private packet network. The switching controller SC1 (130) interconnects using the Internet (100) across the interconnection pathway (116) to the proxy controller PC1 (120). The proxy controller PC1 (120) further interconnects with the connection origination exchange COX1 (110) using the interconnection pathway (102).

According to one embodiment, the mobile devices, access points, base stations and switching controllers may be co-located, while the proxy controllers and the call origination exchanges are physically segregated from the access devices. Such an embodiment is advantageous for a deployment within a multi-building, multi-campus, or a carrier network.

In certain embodiments of the invention, the proxy controller PC1 (120) may be co-located with the switching controller SC1 (120), access points AP1 (140) or base stations and the mobile device MD1 (150). In yet another embodiment of the invention, the switching controller SC1 (130) is collocated with the proxy controller PC1 (120) and the connection origination exchange COX1 (110). In such an embodiment only the mobile device MD1 (150), the access point AP1 (140) and base stations may be collocated. Such an embodiment is advantageous for a large-scale deployment of thinly populated mobile devices.

Figure 3:
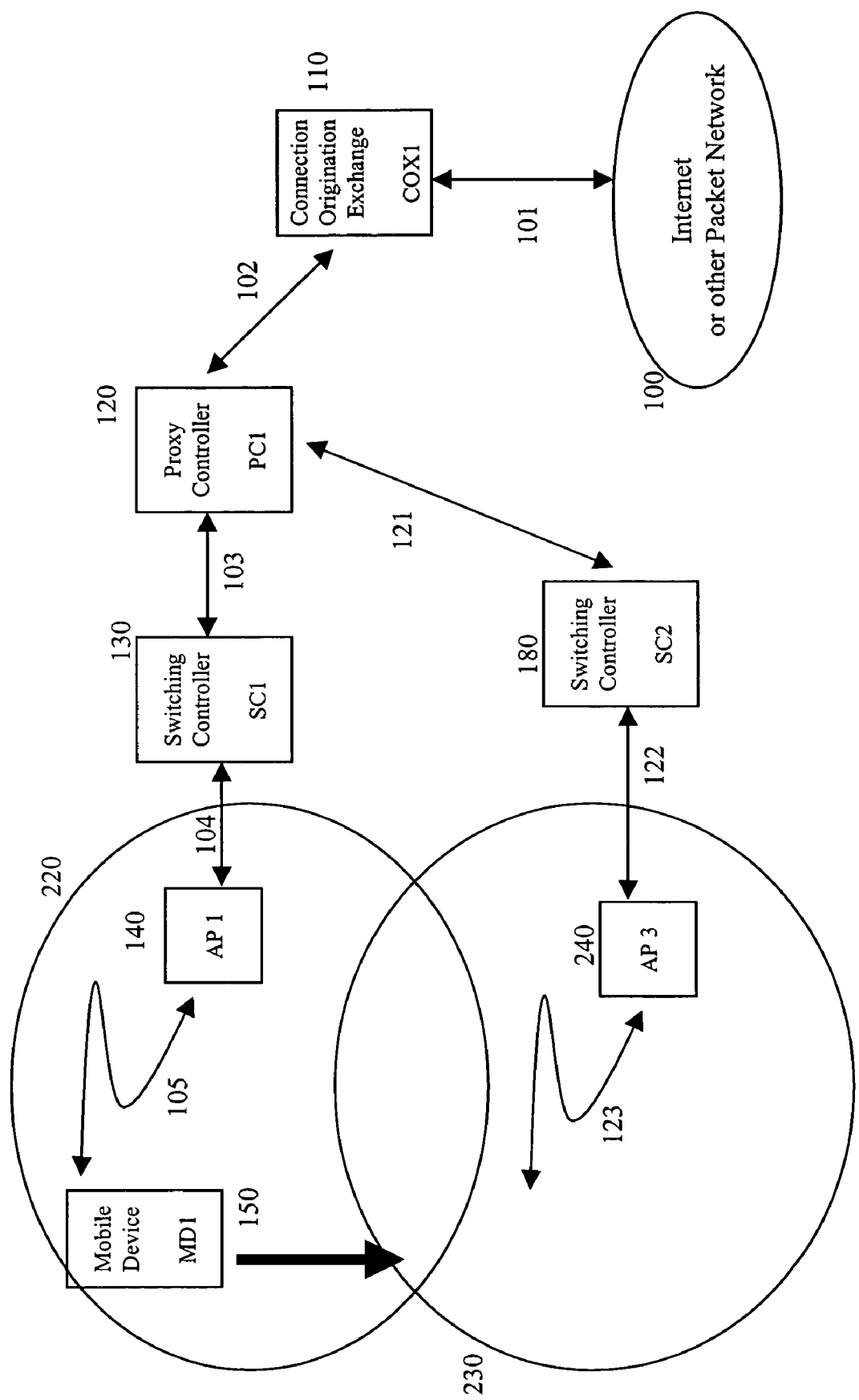
FIG. 3 is a block diagram illustrating an exemplary network having multiple switching controllers, according to one embodiment.

FIG. 3 is a block diagram illustrating an exemplary network having multiple switching controllers, according to one embodiment. As illustrated in FIG. 3, the network includes similar components as outlined in FIG. 1 and FIG. 2. Certain embodiments of the invention incorporate the interconnection of one or more switching controllers, SC1 (130) and SC2 (180) to the proxy controller PC1 (120) within a network utilizing interconnection pathways 103 and 121. In such an embodiment, a given mobile device MD1 (150) may roam from the range of a given access point AP1 (140) to another access point AP3 (240). As discussed previously, if the access points AP1 (140) and AP3 (240) are interconnected utilizing a single switching controller, the network has the mechanisms for implementing the transparency of the mobile device MD1 (150) roaming from AP1 (140) to AP3 (240). The device roaming functionality is provided either by the switching controller, the proxy controller, and/or the connection origination exchange. In an alternative embodiment, where the mobile device transverses from access point AP1 (140) connected to a given switching controller SC1 (130) to access point AP3 (240) connected to another switching controller SC2 (180), the roaming transparency is provided by the proxy controller PC1 (120) or the connection origination exchange COX1 (110).

Furthermore, according to one embodiment, the interconnection pathways 103 and 121 may be either wireless interconnections, wireline interconnections, or across a public or private network such as the Internet (100). Certain embodiments of the network may utilize common infrastructure components such as routers and switches that interconnect both switching controller SC1 and switching controller SC2. FIG. 3 illustrates these merged pathways as two segregated interconnection pathways 103 and 121. The exemplary network of FIG. 3 provides the mechanisms for the information from the two interconnection pathways to remain identifiable on a per access point basis.

Switching Controller SC1 (130) and Switching Controller SC2 (180) may either be physically co-located or physically segregated from each other based upon the specific embodiment of the invention. Certain embodiments of the invention co-locate these devices in proximity to each other. Such embodiments are advantageous in that the traffic densities from the access points interconnected to the given switching controllers are relatively high. The switching controllers cooperate with each other and the proxy controller PC1 (120) and provide a spectrally efficient network.

In one embodiment, a mobile device MD1 (150) initiates a call utilizing AP1 (140). As the mobile device MD1 (150) transverses out of range of the access point AP1 into the range of the access point AP3 (240) it transverses a region where the mobile device can interconnect to both the access point AP1 (140) and access point AP3 (240). The region of overlapping coverage is illustrated within FIG. 3 as overlapping region of the circle 220 about AP1 (140) and the region of the circle 230 about AP3 (230). General practice of wireless network design requires that neighboring cells of wireless coverage are spectrally compatible in that they do not interfere with each other. Various coding methodologies may be used, such as CDMA, TDD, and FDD, among others to provide spectrally compatible contiguous wireless coverage based on the requirements of the specific wireless technology.

The exemplary network of FIG. 3 illustrates a call flow between MD1 to the terminating station. During the initiation of the call, the mobile device MD1 interconnects to the connection origination exchange COX1 (110) utilizing interconnection pathway 105 via the access point AP1 (140). Some time later, the mobile device has two paths of interconnection available, namely pathway 105 to AP1 and pathway 123 to AP3 (240). As the mobile device enters the range of AP3 (240), it initiates a registration request from the mobile device MD1 to the proxy controller PC1 (120). Upon a successful registration, the proxy controller forwards the information to the connection origination exchange COX1 (110). Upon receiving such a message from the proxy controller, the connection origination exchange initiates a conference connection between the terminating station and MD1 (150) via AP1 (140), interconnection pathway 105, and MD1 (150) via AP3 (240), interconnection pathway 123. Once the conference connection is established, COX1 notifies the proxy controller. The proxy controller PC1 (120) receives information and statistics from MD1 utilizing both interconnection pathway 105 and interconnection pathway 123. The proxy controller PC1 (120) cooperates with mobile device MD1 to initiate a switchover of the origination segment of the connection in progress. Upon a successful switchover from interconnection pathway 105 and the interconnection pathway 123 the proxy controller PC1 (120) cooperates with the mobile device MD1 and COX1 to drop the original connection to MD1 via interconnection pathway 105. FIG. 3 further illustrates the notion of connection persistence in that, the switchover sequence as outlined above of the origination segment utilizing interconnection pathway 105 to the new interconnection pathway 123 is completely transparent to the terminating station. The connection transfer of mobile device MD1 (150) from utilizing connection pathway 105 to utilizing connection pathway 123 is seamless and completely managed by cooperation between the proxy controller PC1 (120) and the connection origination Exchange COX1 (110).

Figure 4:
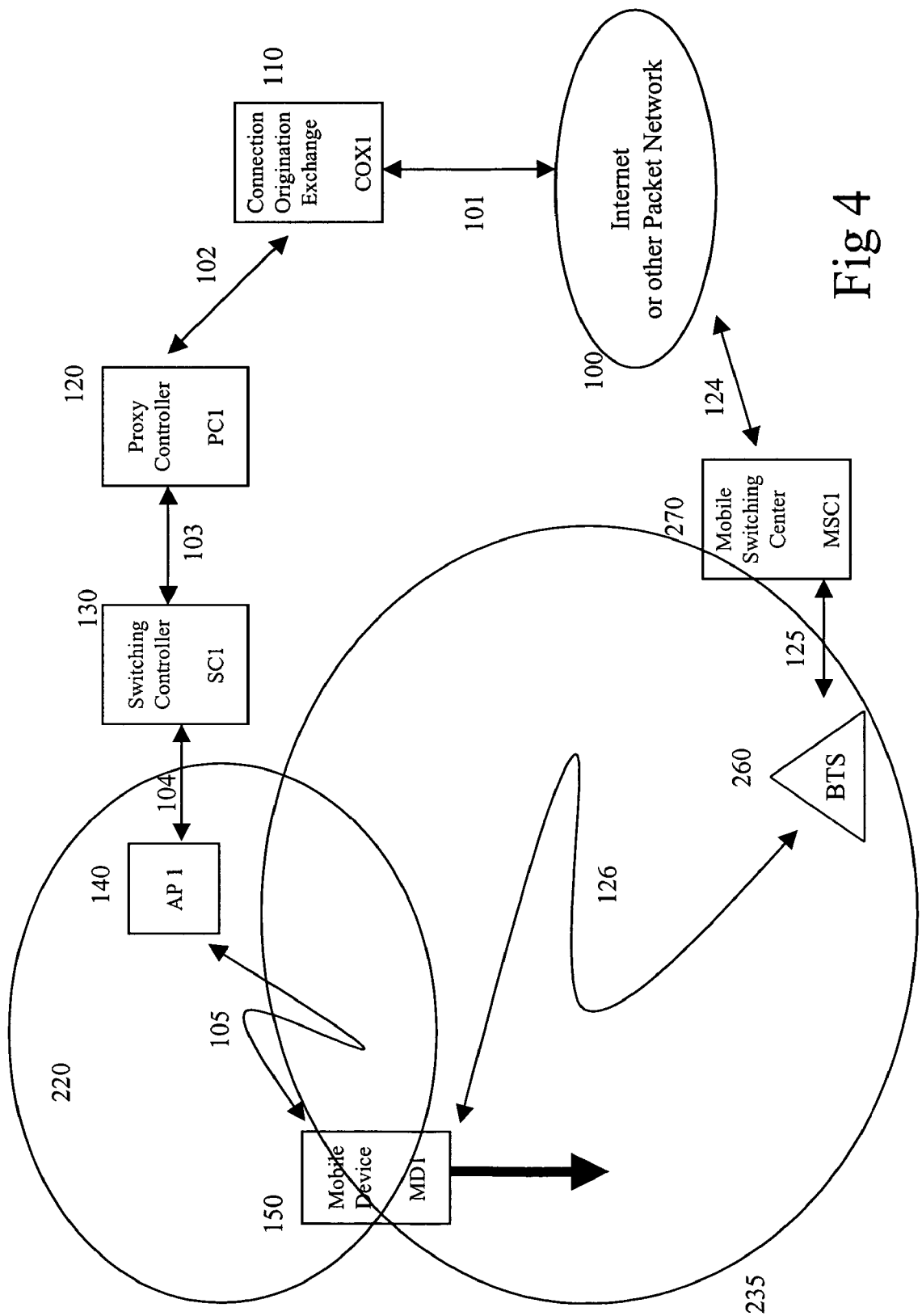
FIG. 4 is a block diagram illustrating an exemplary network, according to another embodiment of the invention.

FIG. 4 is a block diagram illustrating an exemplary network, according to another embodiment of the invention. As illustrated in FIG. 4, the network includes similar components as outlined in FIG. 3 with a WLAN based origination of a call. Certain embodiments of the invention incorporate the interconnection of one or more disparate wireless technologies to the connection origination exchange COX1 (110). In one embodiment, the interconnection pathway 105 is over a local area networking technology such as WiFi. Certain embodiments of the invention provide the mechanisms for the switching controller to support various wireless technologies, such as WiFi, Wimax, and cellular among others. FIG. 4 illustrates certain embodiments of the invention, where the wide area network is operated by an independent carrier and is not under the control of the operator of the connection origination exchange network. In such an embodiment, a given mobile device MD1 (150) is able to roam from the range of a given access point AP1 (140) to another network utilizing access points and base stations from an independent operator namely a base transceiver station BTS (260). The switching controller, the proxy controller, or the connection origination exchange may provide the inter-network roaming functionality based on the level of access and cooperation between the operators of the two networks. FIG. 4 illustrates two separate interconnection pathways 105 and 126 from the mobile node MD1 (150).

Referring to FIG. 4, the mobile devices MD1 (150) has a call in-progress that was initiated utilizing AP1 (140). As the mobile device MD1 (150) transverses out of range of the access point AP1 into the range of the wide area network utilizing a base transceiver station BTS (260), it transverses a region where the mobile device can interconnect to both the access point AP1 (140) and the base transceiver station BTS (260). The region of overlapping coverage is illustrated within FIG. 4 as overlapping region of the circle 220 about AP1 (140) and the region of the circle 235 about BTS (260). Based on the design of the wireless local area network and the wireless wide area network, the overlapping coverage of region 235 about BTS (260) may completely or partially cover the region 220 about AP1 (140). Embodiments of the present invention provide for the mechanisms of initiating a switchover based on parameters from one or more networking components including AP1 (140), MD1 (150), BTS (260), MSC1 (270), SC1 (130), PC1 (120) and COX1 (110).

The exemplary network of FIG. 4 illustrates the topology of a call flow between MD1 to the terminating station. During the initiation of the call the mobile device MD1 interconnects to the connection origination exchange COX1 (110) utilizing interconnection pathway 105 via the access point AP1 (140). Some time later, the mobile device has two paths of interconnection available, namely pathway 105 to AP1 and pathway 126 to BTS (260). As the mobile device enters the range of BTS (260), it initiates a registration request from the mobile device MD1 to the proxy controller PC1 (120).

Upon a successful registration, the proxy controller interrogates its information database to determine the switchover policy for the mobile device MD1 (150). The switchover can be initiated based on one or more models, including but not limited to a preferred network available, least cost network available, ingress access point, egress access point and time of day model. Based on the switchover policy, the proxy controller PC1 (120) may elect to notify the connection origination exchange COX1 (110) with a request for a switchover. Upon receiving such a message from the proxy controller, the connection origination exchange initiates a conference connection between the terminating station and MD1 (150) via AP1 (140), interconnection pathway 105, and MD1 (150) via BTS (260), interconnection pathway 126. Once the conference connection is established, COX1 notifies the proxy controller. The proxy controller PC1 (120) receives information and statistics from MD1 (150) utilizing both interconnection pathway 105 and interconnection pathway 126. The proxy controller PC1 (120) cooperates with mobile device MD1 (150) to initiate a switchover of the origination segment of the connection in progress. Upon a successful switchover from interconnection pathway 105 and the interconnection pathway 126 the proxy controller PC1 (120) cooperates with the mobile device MD1 and COX1 to drop the original connection to MD1 via interconnection pathway 105. As in FIG. 3, the connection transfer of mobile device MD1 (150) from utilizing connection pathway 105 to utilizing connection pathway 126 is seamless to the terminating station and completely managed by cooperation between the proxy controller PC1 (120) and the connection origination Exchange COX1 (110).

FIG. 4 further illustrates the interconnection of the connection origination exchange COX1 (110) to the wireless wire area network, such as a GPS/GPRS cellular network. As outlined in FIG. 4, COX1 can connect to the wide area network in one or more ways, such as interconnection through the PSTN or over the Internet. FIG. 4 illustrates an interconnection from the connection origination exchange (COX1) across the interconnection 101 to the Internet (100), across the interconnection pathway 124 to the mobile switching center MSC1 (270) of the GPS/GPRS cellular wide area network. The MSC1 (270) is further interconnected to the base transceiver station BTS (260) through the interconnection pathway 125. The BTS (260) is further interconnected to the mobile device MD1 (150) with the GPS/GPRS wireless interconnection pathway 126.

Figure 5:
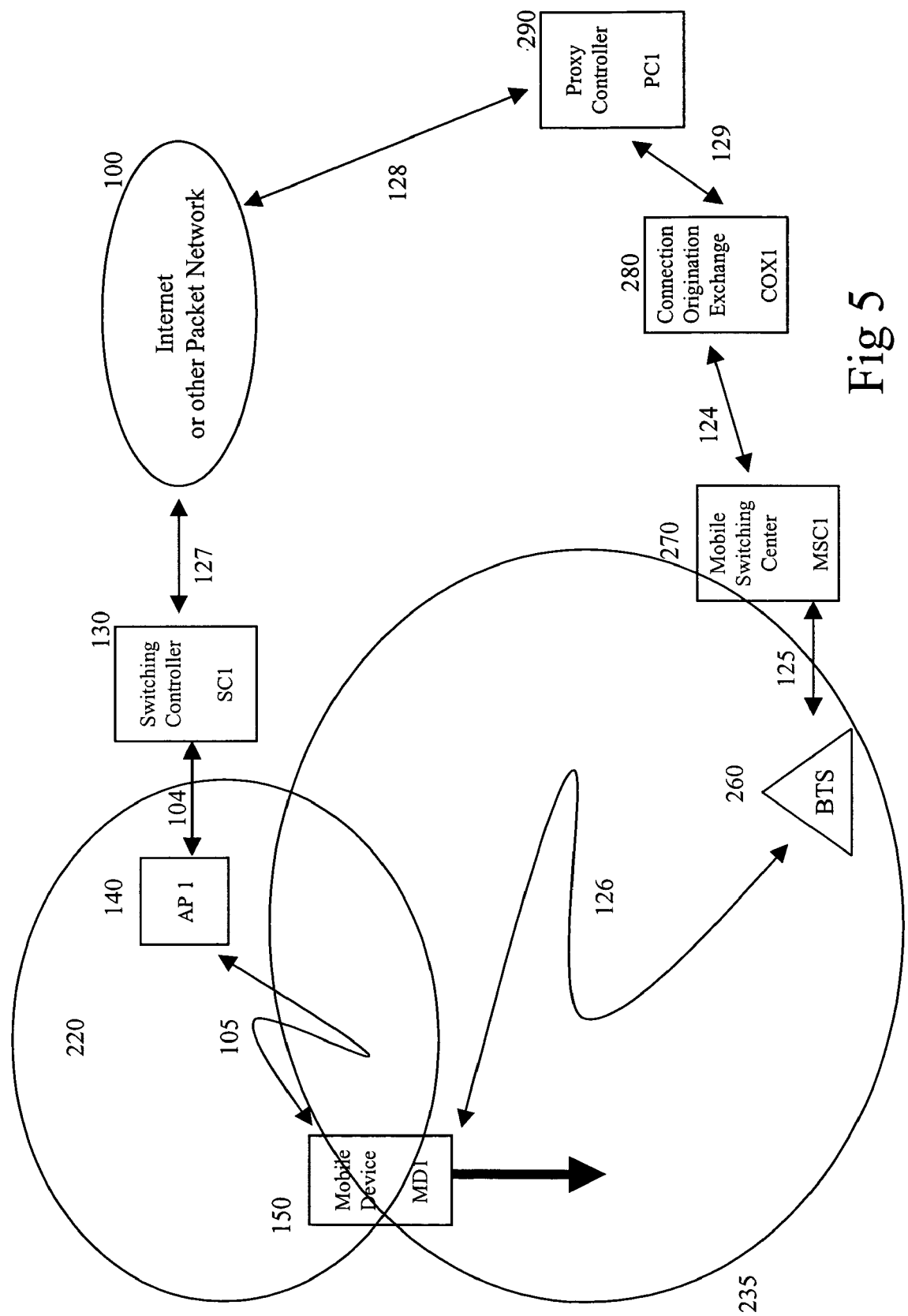
FIG. 5 is a block diagram illustrating an operator-deployed distributed disparate wireless switching network, according to one embodiment.

FIG. 5 is a block diagram illustrating an operator-deployed distributed disparate wireless switching network, according to one embodiment. In the exemplary diagram of FIG. 5, the details of operator-deployed interconnection of the network components are outlined. The operator-deployed model utilizes both the proxy controller PC1 (290) and the connection origination exchange COX1 (280) deployed within the operator wide area wireless network. One of the advantages in the operator-deployed embodiment is that the proxy controller and the connection origination controller can be deployed physically collocated with the other equipment of the operator's network. Physical collocation of the proxy controller and the connection origination controller provides the ability for the operator to provide a more secure and robust offering.

In one embodiment, the exemplary network includes a mobile device MD1 (150) that interconnects to an access point AP1 (140) across an interconnection pathway 105. The access point AP1 (140) provides the wireless connectivity utilizing one or more local area and wide area networking technologies, such as WiFi, WiMax, CDMA, TDMA, GSM cellular, etc. Based on the technologies deployed, the mobile device MD1 (150) may interconnect with the access point or a base station AP1 (140) using one or more of the of wireless and wireline technologies through the interconnection pathway 105. As mobile device MD1 (150) enters the range of communication with AP1 (140), the mobile device may elect to register itself for the interconnection based on a scan of activity in the appropriate wireless region. Alternatively, the mobile device MD1 (150) may elect to initiate an attempt to communicate with potential access points within its range from time to time. The registration request from the mobile device MD1 (150) is routed across the access point AP1 (140), across interconnection pathway 104, to the switching controller SC1 (130). The switching controller in turn forwards the registration request across an interconnection pathway to the Internet (100). The registration request is routed across the Internet (100) through an interconnection pathway 128 to the operator deployed proxy controller PC1 (290). The proxy controller in turn notifies the connection origination exchange COX1 (280) across interconnection pathway 129. The connection origination exchange COX1 (280) in turn routes the notification to the mobile switching center MSC1 (270) across the interconnection pathway 124. The interconnection pathway 124 may elect to either emulate a base transceiver station interface, a data interface, or a TDM interface, based on the specific embodiment of the connection origination exchange. The mobile switching center MSC1 (270) may in-turn elect to utilize the information from the connection origination exchange, or else it may elect to completely ignore the notification. In certain embodiments of the invention, the connection origination exchange COX1 (280) further emulates the complete functionality of the base transceiver station. In such an embodiment, the interconnection 124 from COX1 (280) is treated as one of the pluralities of base transceiver stations connected to the mobile switching center MSC1 (270).

FIG. 5 illustrates the operation of the distributed disparate wireless switching network in an operator-deployed configuration. Embodiments of the invention provide the mechanisms for the proxy controller PC1 and the connection origination exchange COX1 (280) to be collocated with the operator network. In certain embodiments, the functionality of the proxy controller PC1 (290), the interconnection pathway 129, and the functionality of the connection origination exchange COX1 (280) may be physically collocated within a single chassis. In such an embodiment, the mobile switching center MSC1 is able to interconnect with the mobile device MD1 (150) through the WLAN access point AP1 (140) across the interconnection path 124.

Figure 6:
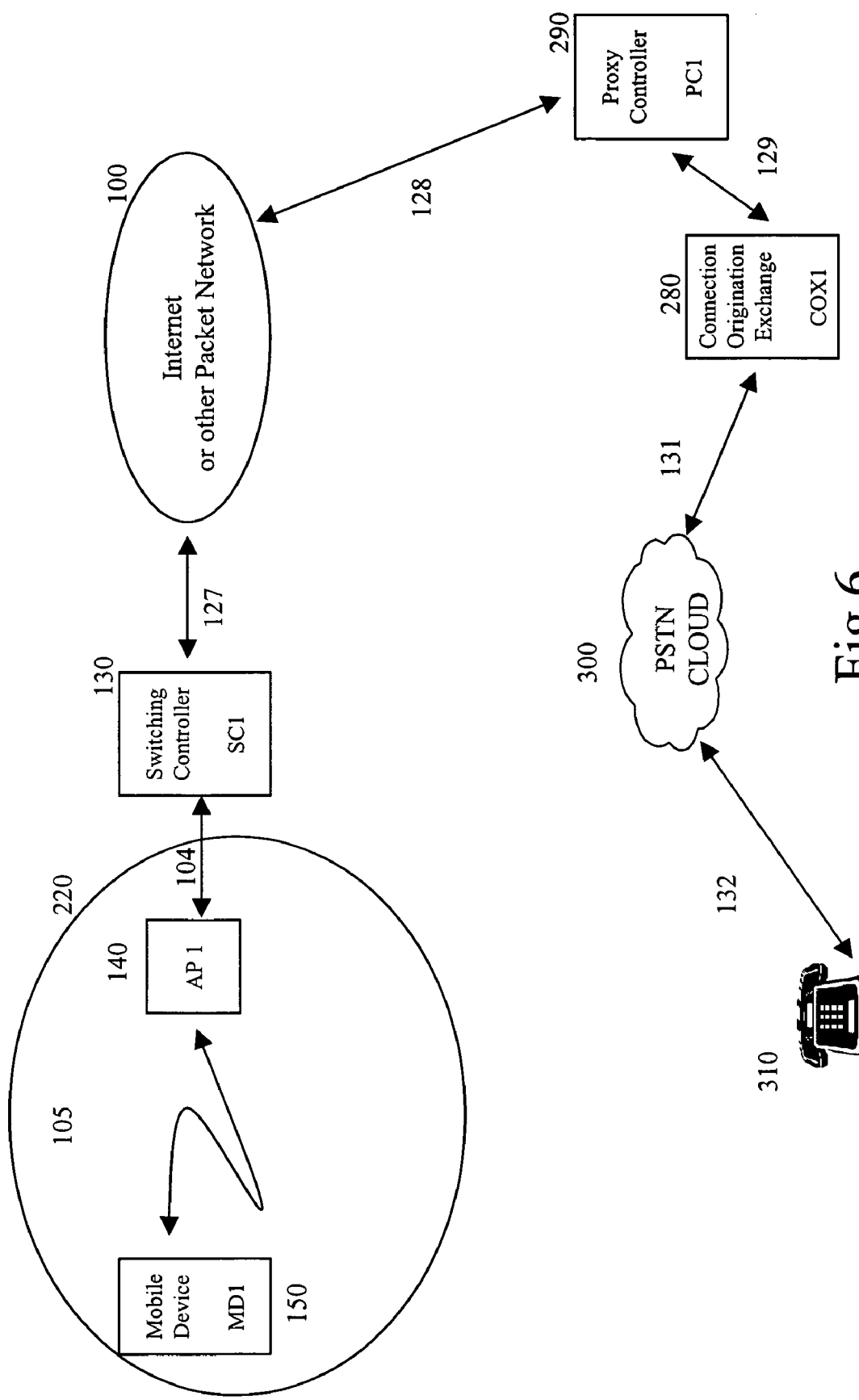
FIG. 6 is a block diagram illustrating an exemplary distributed disparate wireless switching network, according to one embodiment.

FIG. 6 is a block diagram illustrating an exemplary distributed disparate wireless switching network, according to one embodiment. In this embodiment, the interconnection of the switching controller SC1 (130) to the public switched telephone network (PSTN) is shown.

Embodiments of the invention introduce the notion of wired mobility in that a mobile device may communicate using an over the air network to a wired network and the mobile device may further communicate to the switching controller SC1 (130). The switching controller SC1 (130) provides the functionality to register the mobile device in cooperation with the proxy controller PC1 (290) to establish the policy and control associated with the mobile device. The connection is originated from the connection origination exchange COX1 (280), through the PSTN to the termination POTS device (310). FIG. 6 outlines an exemplary topology where the switching controller SC1 (130) utilizes interconnection pathway 127 across the Internet (100) utilizing the interconnection pathway 128 to interconnect to the proxy controller PC1 (290). In one embodiment, the switching controller SC1 (130) may interconnect using traditional TDM wired interfaces, such as SONET, T1, and OC3, among others. In such an embodiment, the switching controller may elect to interconnect to the proxy controller PC1 (290) utilizing the PSTN and TDM infrastructure.

In one embodiment, a POTS device (310) may initiate a connection across the PSTN to the connection origination exchange COX1 (280). In such an embodiment, COX1 (280) may then originate a connection on behalf of the initiating POTS device (310) to a terminating station. This approach is advantageous in comparison to traditional wired solutions in that the receiving party at the terminating end of the connection sees a unique identifier associated with the call regardless of where the call was originated. Such an approach is further advantageous in that the connection remains persistent in case of an interruption of service in the PSTN segment of the connection. In an exemplary call flow, a remote in-field employee can originate a call from a remote location across the PSTN, but the unique identifier received by the terminating station is the virtual proxy subscriber number rather than the telephone number of the POTS device (310).

The exemplary diagram of FIG. 6 includes a mobile device MD1 (150) that interconnects to an access point AP1 (140) across an interconnection pathway 105. The access point AP1 (140) provides the wireless connectivity utilizing one or more local area and wide area networking technologies, such as WiFi, WiMax, CDMA, TDMA, GSM cellular, among others. Based on the technologies deployed, the mobile device MD1 (150) may interconnect with the access point or a base station AP1 (140) using one or more of the wireless and wireline technologies through the interconnection pathway 105. As mobile device MD1 (150) enters the range of communication with AP1 (140), the mobile device may elect to register itself for the interconnection based on a scan of activity in the appropriate wireless region associated with the wireless technologies in use. Alternatively, the mobile device MD1 (150) elects to initiate an attempt to communicate with potential access points within its range from time to time. The registration request from the mobile device MD1 (150) is routed across the access point AP1 (140), across interconnection pathway 104, to the switching controller SC1 (130). The switching controller in turn forwards the registration request across an interconnection pathway to the Internet (100). The registration request is routed across the Internet (100) through an interconnection pathway 128 to a proxy controller PC1 (290). The proxy controller in turn notifies the connection origination exchange COX1 (280) across interconnection pathway 129.

From time to time, the mobile device MD1 (150) may elect to initiate a connection request. The connection request is routed through interconnection pathway 105, through AP1 (140), through SC1 (130), through the Internet (100) to the proxy controller PC1 (290). The proxy controller receives the connection request and establishes the policy requirements of the connection based on the subscriber level agreement. The proxy controller PC1 (290) then proceeds to forward the connection request to the connection origination exchange COX1 (280). The connection origination exchange in turn initiates the connection on behalf of the mobile device MD1 (150). As the mobile device MD1 (150) travels out of range of the access point AP1 (140) the connection origination exchange continues to maintain the connection to the terminating station based on the established policy of the originating subscriber. The call flow for a POTS device (132) origination follows a similar flow as the mobile device MD1 (150). The notion of wired mobility supported is advantageous in that it provides mechanisms for a POTS device to be used for initiating a connection, then some time later to transition the connection to a mobile device such a cellular phone, and finally the re-transportation of the connection to another POTS device.

Figure 7:
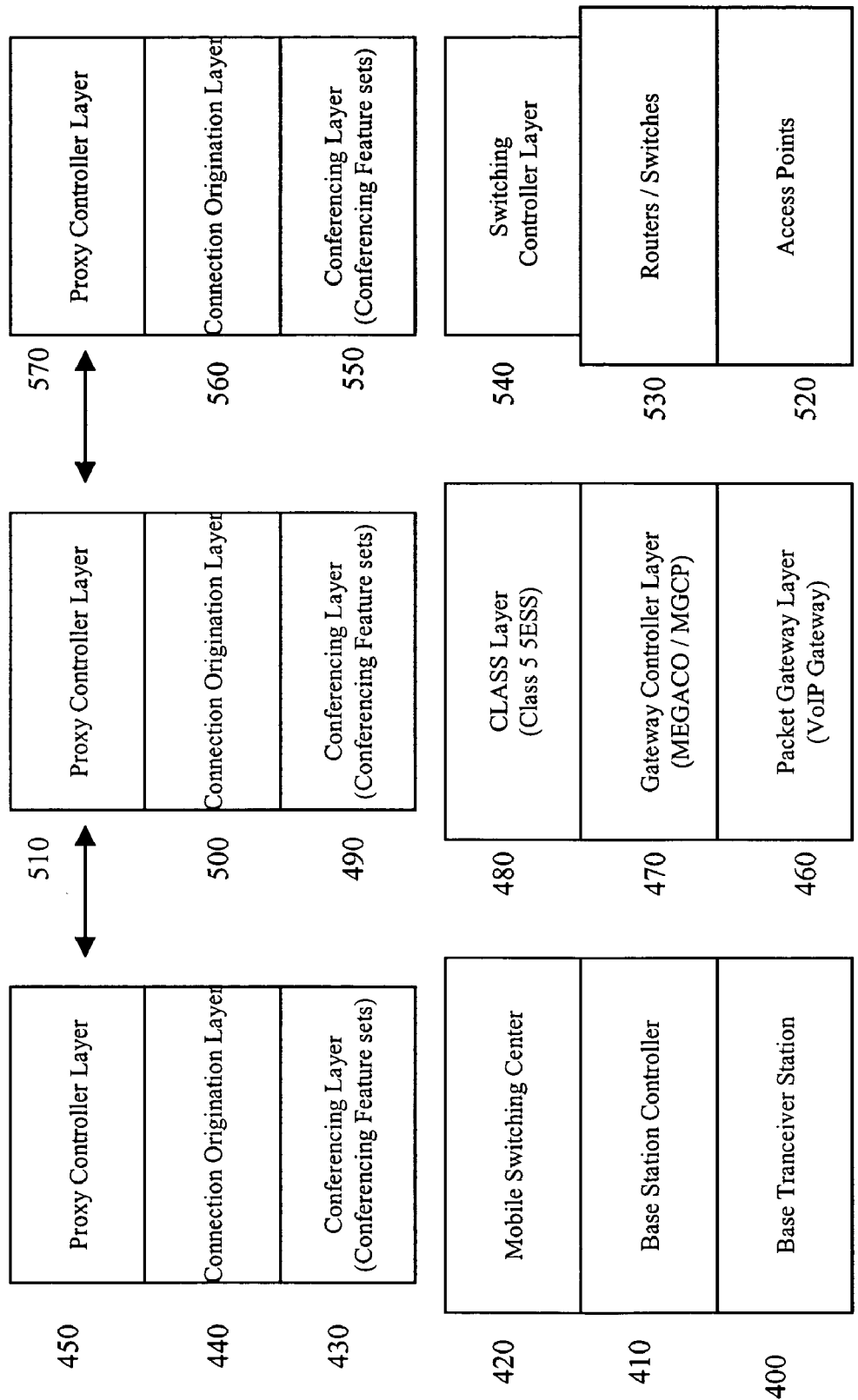
FIG. 7 is a block diagram illustrating an exemplary network stack of a distributed disparate wireless switching network, according to one embodiment.

FIG. 7 is a block diagram illustrating an exemplary network stack of a distributed disparate wireless switching network, according to one embodiment. Embodiments of the invention provide the mechanisms to interconnect with one or more networking technologies including packet, TDM, wireless, and wireline technologies. The exemplary diagram of FIG. 7 outlines interconnection of the distributed disparate wireless switching network with the cellular wide area network, the public switched telephone network and the wireless local Area network. Certain embodiments of the invention incorporate one or more of the functionalities outlined in FIG. 7 in physically collocated chassis, however for the discussion of FIG. 7, each of the functionalities will be discussed as a stand-alone device capable of delivering the specific functionality. One of the advantages is that it provides mechanisms to interconnect with not only disparate wireless technologies, but it also provides mechanisms to interconnect with one or more existing interconnection networks such as cellular networks, wireline networks, and wireless local area networks. The diagram of FIG. 7 outlines the major components and the interconnection with embodiments of the present invention.

In one embodiment, a wide area wireless network includes three major components, namely one or more base transceiver stations (400) interconnected to a base station controller (410). The base station controllers (410) in-turn are interconnected to a mobile switching center (420). A mobile device interconnects with the base transceiver station (400) over a wireless connection such as GSM or CDMA, among others. Generally the mobile switching center manages the subscriber information utilizing database interactions to home location registry (HLR) and visitor location registry (VLR). As mobile devices move from region to region, the mobile switching center cooperates with the mobile device to provide the cellular roaming capability. A mobile device may initiate a call from a given base transceiver station and at some point later may transition to a different base transceiver station (BTS). The new base transceiver station (400) may further be interconnected to a different base station controller (410) from the initial base station controller. The mobile switching center initiates a connection to the PSTN network to terminate the call. Generally the switchover roaming capability is managed by the mobile switching center. Such approaches are disadvantageous in that they require access to the mobile switching center, the base station controllers and the base transceiver stations. An embodiment of the invention segregates the switchover roaming functionality and introduces a proxy controller layer (450) that manages such functionality uniformly for various disparate access technologies. In one embodiment, proxy controller (450) may cooperate with the connection origination exchange to provide a connection origination layer (440) in initiating a termination on behalf of the originating mobile device. The connection origination layer (440) is responsible to manage the physical connection. The connection origination exchange may further incorporate the functionality of a conferencing layer (430), or may elect to utilize the conferencing feature sets of existing components to manage the persistence of the connection on behalf of the mobile device. Referring to FIG. 7, the conferencing layer (430) interconnects with the mobile switching center (420) to provide the interconnection capability within a wide area wireless network such as GSM or CDMA cellular networks.

TDM and voice over IP wireline networks include three major components, namely one or more packet gateways (460), a gateway controller (470), utilizing standards based gateway control protocols such as MEGACO or MGCP, among others, and finally class layer (480) composed of class 5 switches, class 4 switches and interconnection networks. This section discusses a call flow initiated from an IP based wireline subscriber, however the discussion applies equally to a subscriber initiated POTS based wireline call.

Referring to FIG. 7 a VoIP subscriber interconnects to the gateway layer utilizing general VoIP protocols to packetize voice traffic, such as SIP, H323, and one of one or more CODEC like G.711, G.723, or G.729, among others. The gateway layer (460) interconnects and cooperates with the gateway controller layer (470) to provide connectivity of the mobile device to a class layer (480). The class layer cooperates with the gateway controller layer (470) in providing the means for a mobile device to interconnect to a terminating station. The class layer (480) may be an application written in conjunction with a softswitch architecture or alternatively the class layer may be an interconnection to a traditional class 5/class 4 interconnection network of the PSTN architecture.

According to one embodiment, an interconnection to a wireline network may be established by connecting the connection conferencing layer (490), the connection origination layer (500) and the proxy controller layer (510) with the class layer (480). The proxy controller layer (510) manages the switchover roaming functionality as outlined earlier. The proxy controller cooperates with the connection origination exchange and provides a connection origination layer (500) to initiate or terminate a connection on behalf of the originating mobile device. The connection origination layer (500) cooperates with the conferencing layer to initiate the physical connectivity to the terminating station. The conferencing layer (490) provides the physical interfaces for connecting to the class layer (480) in cooperation with the connection origination layer (500). Once connectivity has been established between the originating station and the terminating station, the proxy controller layer and the connection origination layer (500) cooperate with the conferencing layer (490) to maintain roaming connectivity.

A wireless local area network (WLAN) includes one or more access points (520) and routers and switches (530). Traditional WLANs are designed primarily for data traffic, and provide LAN based switching and routing for IP packets. Such approaches are inadequate as no level of connection persistence is available when utilizing disparate technologies. FIG. 7 outlines a call flow initiated from a WiFi WLAN based subscriber, however the discussion applies equally to a subscribers utilizing one or more other WLAN technologies such as WiMax, and UWB, among others.

In the exemplary diagram of FIG. 7, a WiFi WLAN subscriber interconnects to the access point (520) utilizing traditional protocols such as VoIP, SIP, H.323 and 802.11 with one or more CODEC like G.711, G.723, or G.729, among others. The access point (520) layer interconnects and cooperates with the routers and switches to provide connectivity from the mobile device to a switching controller layer (540). The switching controller layer cooperates with the routers and switches (530) in providing ways for a mobile device to interconnect to a terminating station.

According to one embodiment, an interconnection to a WLAN may be established by connecting the conferencing layer (550), the connection origination layer (560) and the proxy controller layer (570) with the switching controller layer (540). The proxy controller layer (570) manages the switchover roaming functionality as outlined earlier. The proxy controller cooperates with the connection origination exchange and provides a connection origination layer (560) to initiate or terminate a connection on behalf of the originating mobile device. The connection origination layer (560) cooperates with the conferencing layer to initiate the physical connectivity to the terminating station. The conferencing layer (550) provides the physical interfaces for connecting to the switching controller layer (540) in cooperation with the connection origination layer (560). Once connectivity has been established between the originating station and the terminating station, the proxy controller layer (570) and the connection origination layer (560) cooperate with the conferencing layer (490) to maintain roaming and other mobile connectivity.

Figure 8:
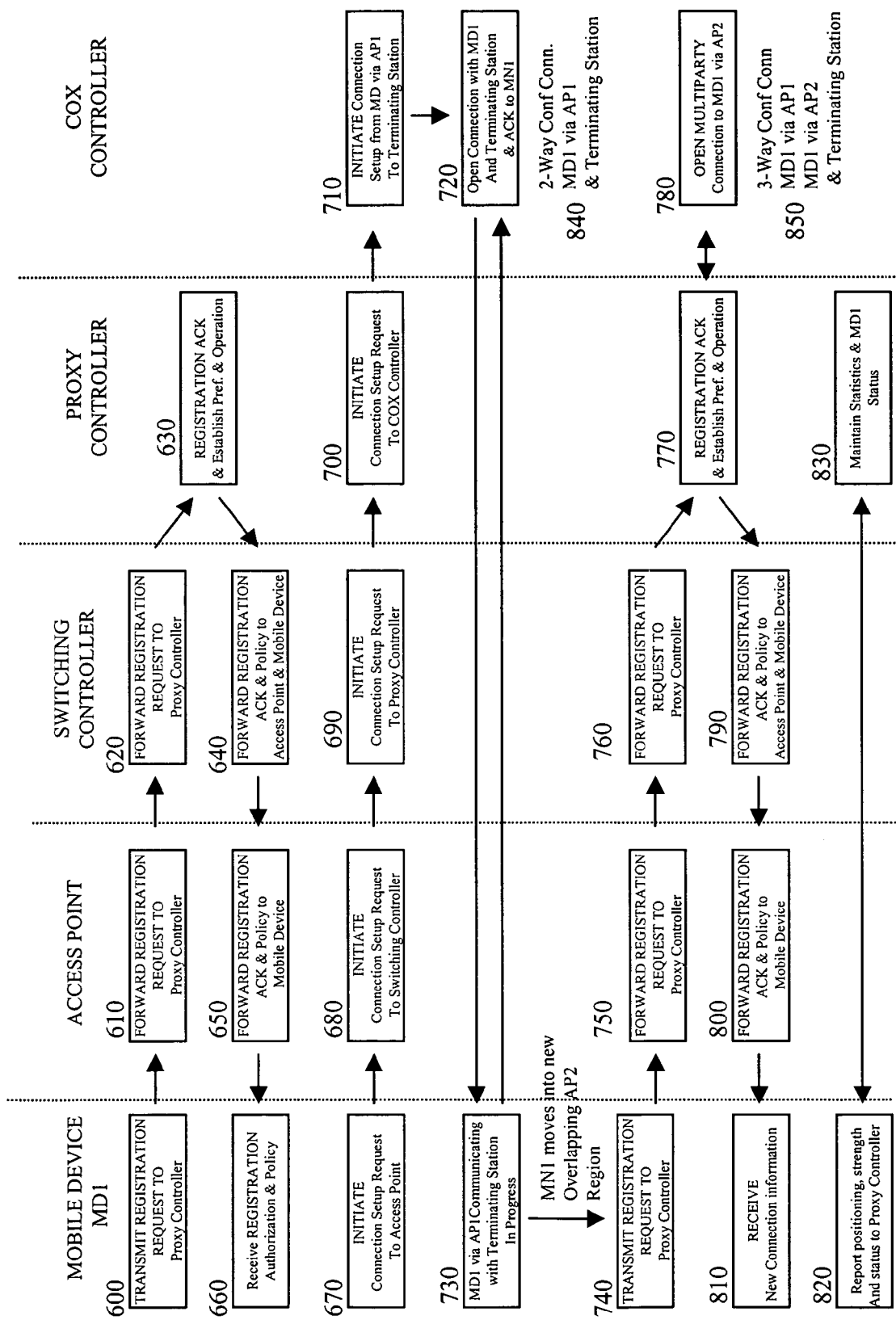
FIGS. 8-10 are diagrams illustrating exemplary processes for processing registration requests according to certain embodiments.
Figure 9:
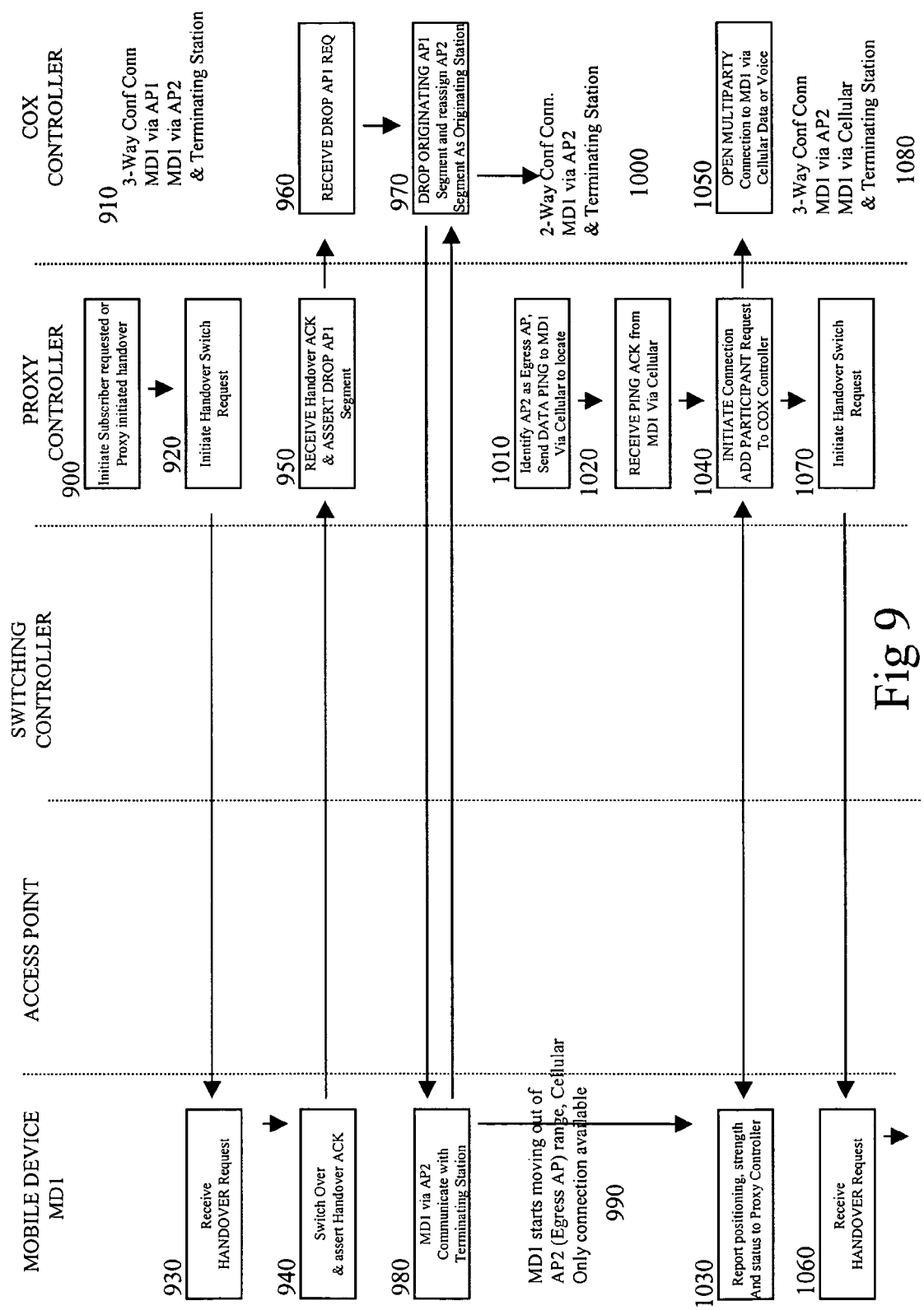
Figure 10:
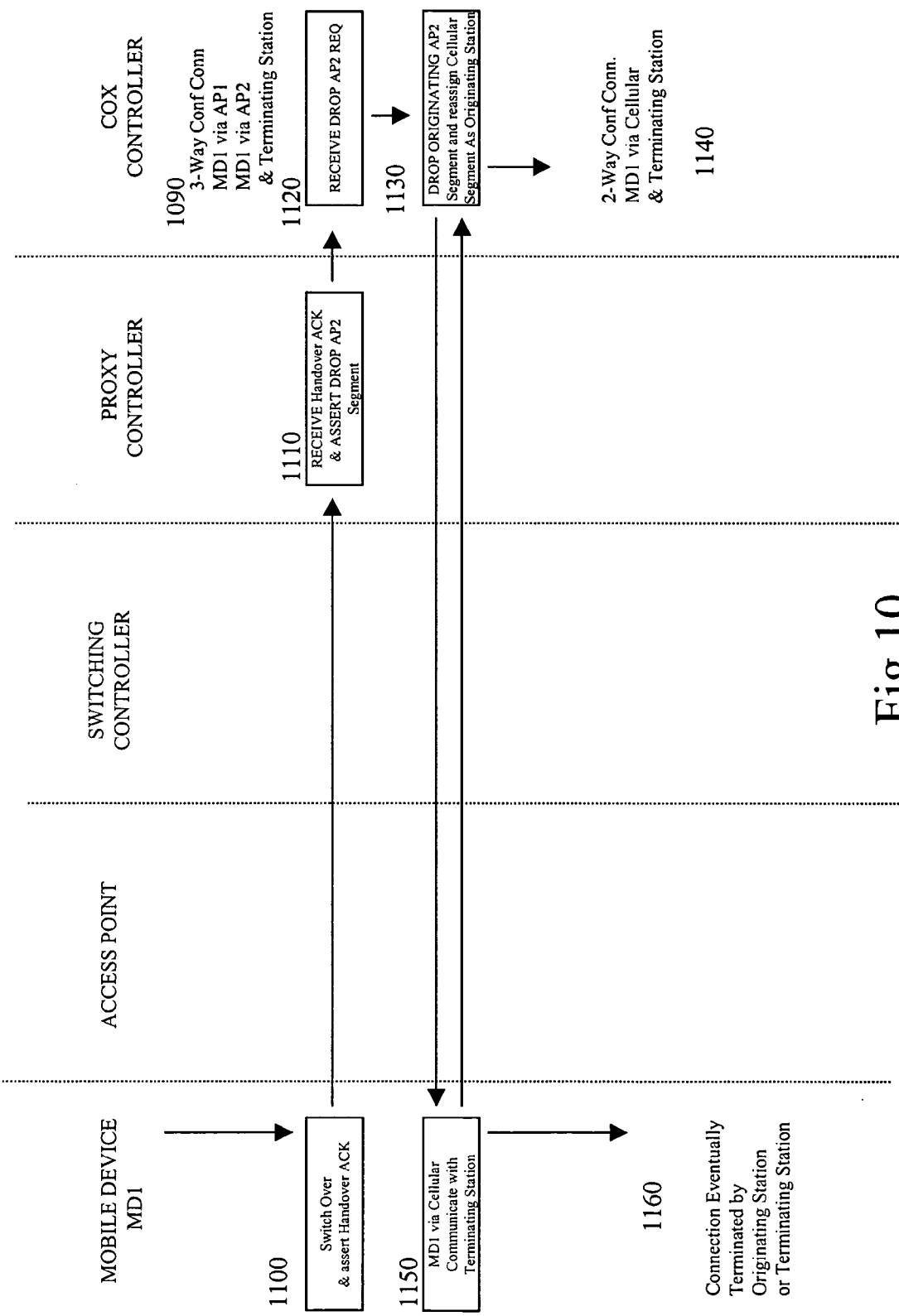

FIGS. 8 through 10 are flow diagrams illustrating the call flow and functionalities of the major components of the distributed disparate wireless switching network, according to certain embodiments. FIGS. 8 through 10 outline certain embodiments of the invention including a mobile device composed of one or more wireless interfaces, such as WiFi and cellular, a wireless network having access points or base stations, a switching controller, a proxy controller, and a COX controller.

The diagrams of FIG. 8 through 10 outline a mobile device MD1 initiated registration request, followed by a mobile device MD1 initiated voice connection origination through a WiFi access point AP1, followed by the roaming of MD1 to another WiFi access point AP2, followed by the roaming of MD1 to a cellular network, and finally the termination of the connection by the origination mobile device MD1.

Upon a successful power up of a mobile device MD1, or upon a discovery of an available WLAN access point, the mobile device MD1 transmits a registration request to the proxy controller (600). Once the WLAN access point has received the registration request, the access point proceeds to forward the registration request to the switching controller (610). The switching controller then receives the registration request and the switching controller proceeds to forward the registration request to the proxy controller (620). The proxy controller then receives the registration request and the proxy controller proceeds to acknowledge the registration request and to establish the preferred mode of operation (630).

The switching controller receives the registration acknowledgement from the proxy controller and proceeds to forward the registration acknowledgement and the policy to the access point and the mobile device (640). The switching controller further proceeds to maintain a database of the status of the state of the mobile devices and the access point. Upon receiving the message from the switching controller the access point or base station proceeds to forward the registration acknowledgement and the policy to the mobile device (650). The access point or the base station further proceeds to maintain a database of the status of the state of the mobile devices. Once the mobile device has received the registration acknowledgement, the mobile device proceeds to record the event for later use and annunciate the availability to the user.

The user may elect to initiate a connection setup request to the access point (670) from time to time. Upon receiving the message the access point or base station proceeds to forward the Initiate connection setup request to the switching controller (680). The switching controller in turn proceeds to forward the message to initiate connection setup request to the proxy controller (690). Once the message is received by the proxy controller the proxy controller ascertains the authorization and the authentication of the subscriber and proceeds to notify the COX controller to initiate connection setup request. Once the COX Controller receives the initiate connection setup from the mobile device via AP1 (710), the COX controller proceeds to open a connection with MD1 and the terminating station and further acknowledges the connection to the mobile device (720). The proxy controller, switching controller, access points and mobile devices cooperate with the COX controller in establishing a communications channel between the COX controller and the mobile device MD1. The mobile device MD1 now proceeds to communicate with the terminating station (730). The COX controller has now cooperated with the other networking elements of the distributed disparate wireless switching network in establishing a two-way conferencing connection between MD1 via AP1 on the one segment and the terminating station on the other segment (840).

The mobile device MD1 may at some time move from the proximity of AP1 towards the proximity of AP2. There exists an overlap region, where the mobile device may interconnect with both AP1 and AP2. As with the process of registration with access point AP1, the mobile device elects to transmit a registration request to the proxy controller utilizing AP2 (740). The request is forwarded by the access point AP2 (750) and then by the switching controller (760) and is finally received by the proxy controller. Upon receiving the message the proxy controller proceeds to send a registration acknowledgement and establish the preferred operation based on the subscriber preferences (770). The registration acknowledgement and policy is forwarded by the switching controller (790), then forwarded by the access point (800) and is then received by the mobile device MD1 (810). The proxy controller upon receiving the registration request from the mobile device further proceeds to send an acknowledgement to the COX controller. The COX controller upon receiving such an acknowledgement proceeds to open a multiparty conference connection between the mobile device and the COX controller (780). The parties are now connected in the 3-way conference connection are the mobile device MD1 via AP1, the terminating station, and now the mobile device MD1 via AP2 (850).

The mobile device cooperates with the access point and the switching controller to provide reports on positioning, strength and other information to the proxy controller (820). The proxy controller further proceeds to maintain a database of statistics and other information regarding the mobile device MD1 (830) in order to maintain and affect policy decision regarding the communications between the mobile device MD1 and other parties.

FIG. 9 is a continuation of the exemplary diagram illustrating the call flow and functionalities of the major components of the distributed disparate wireless switching network. The top of FIG. 9 outlines a scenario where the mobile device MD1 is within range of both AP1 and AP2. The mobile device has already registered with the proxy controller through both AP1 and AP2. The proxy controller has further cooperated with the connection origination controller COX1 to establish a three-way conference connection through AP1, AP2, and to the terminating station (910).

The mobile device MD1 at some time later further moves from the proximity of AP1 towards the proximity of AP2. The mobile device cooperates with the proxy controller to trigger a subscriber initiated, mobile device initiated, infrastructure component initiated or a proxy controller initiated handover (900) based on one or more parameters such as signal strength, positioning, traffic capacity, quality of service (QoS) and class of service, among others. The proxy controller proceeds to initiate a handover switch request (920) and cooperates with the switching controller, the access point and base station in forwarding the request to the mobile device. Once the mobile device receives a handover request from the proxy controller (930) it proceeds to switch over the active connection from the interconnection pathway through AP1 to the interconnection pathway through AP2 and to further assert the handover acknowledge (940). The switchover & handoff acknowledgement (940) is forwarded by the access point and then by the switching controller to the proxy controller. Once the proxy controller receives the handover acknowledgement, it initiates a request for the COX controller to drop the MD1 through AP1 segment (950). Upon receiving the drop AP1 request (960), the COX controller proceeds to drop the originating AP1 segment and reassigns AP2 segment as the originating station (970). The system is once again operating in a two-way conferencing connection between the mobile device MD1 and the terminating station (1000).

The mobile device MD1 continues communication with the terminating station (980) in cooperation with the access points, base stations, switching controller, proxy controller, and the COX controller.

In one embodiment, the mobile device may register with the proxy controller over the cellular voice and data networks in one or more ways. In a further embodiment, a mobile device may interconnection over the mobile switching center (MSC) using various technologies, over the PSTN network, over a private network or over the Internet. The mobile devices may register with the proxy controller utilizing voice networks or data networks. As the mobile device comes in and out of the cellular coverage areas, the mobile device cooperates with the proxy controller to register its availability.

The mobile device MD1 at some time later further moves from the proximity of AP2 towards a region with only cellular coverage. Certain access points and base stations are deemed to be egress AP, implying that they are located near entrance and exits of a structure or region. Prior connection databases can aid in identifying roaming patterns and help in providing predictive handoff. In such an embodiment of the present invention, a roaming database is maintained on a per AP basis and on a per mobile node basis. The present invention provides predictive connectivity by analyzing the statistics of prior usage patterns and providing the means for early redundant connectivity before events causing connectivity failures can occur. By virtue of utilization of conferencing technology, the COX controller cooperates with the proxy controller in establishing multi-segment connectivity to the mobile device. Once an event occurs rendering a prior active path to be compromised, the proxy controller in cooperation with other networking components elects a new active path. As the mobile device MD1 moves out of range of AP2, the proxy controller may have previously identified AP2 as an egress AP and subsequently sent a DATA PING to MD1 through the cellular data network to locate the mobile device in the data network (1010).

In the exemplary call flow of FIG. 9, the mobile device is within the cellular data coverage as it egresses from the range of AP2 and receives the DATA PING from the proxy controller through the cellular network (1020). The proxy controller then initiates a connection to add a participant to the COX controller's connectivity between mobile device through AP2 and the terminating station (1040). The COX controller upon receiving the message opens a three-way conference connection between mobile device MD1 through AP2, mobile device through the cellular network, and the terminating station. The active participants remain MD1 through AP2 and the terminating station. The mobile device continues to cooperate with the switching controller and the access point in reporting positioning, strength and other information to the proxy controller (1030). The mobile device further cooperates with the proxy controller to trigger a subscriber initiated, mobile device initiated, infrastructure component initiated or a proxy controller initiated handover based on one or more parameters such as signal strength, positioning, traffic capacity, quality of service and class of service, among others. The proxy controller proceeds to initiate a handover switch request (1070) and cooperates with the switching controller, the access point and base station in forwarding the request to the mobile device. The mobile device receives the hand over request (1060).

FIG. 10 is a continuation of the exemplary diagram illustrating the call flow and functionalities of the major components of the distributed disparate wireless switching network. The top of FIG. 10 outlines a scenario where the mobile device MD1 is within range of both AP2 and the cellular network. The mobile device has already registered with the proxy controller through both AP2 and the cellular network. The proxy controller has further cooperated with the connection origination controller COX1 to establish a three-way conference connection through AP2, the cellular network and to the terminating station (1090). The proxy controller has cooperated with the mobile device and initiated a handover switch request. The mobile device has received the handover request.

Once the mobile device receives a handover request from the proxy controller (1060) in FIG. 9 the mobile device proceeds to switch over the active connection from the interconnection pathway through AP2 to the interconnection pathway through the cellular connection and to further assert the handover acknowledge (1100) in FIG. 10. The switchover & handoff acknowledgement (1100) is forwarded by the access point and then by the switching controller to the proxy controller. Once the proxy controller receives the handover acknowledgement it initiates a request for the COX controller to drop the MD1 through AP2 segment (1110). Upon receiving the drop AP2 request (1120), the COX controller proceeds to drop the originating AP2 segment and reassigns the cellular segment as the originating station (1130). The system is once again operating in a 2-way conferencing connection between the mobile device MD1 through the cellular network and the terminating station (1140). The mobile device MD1 continues to communicate with the terminating station (1150) until such time as the connection is finally terminated either by the originating station or the terminating station (1160).

Figure 11:
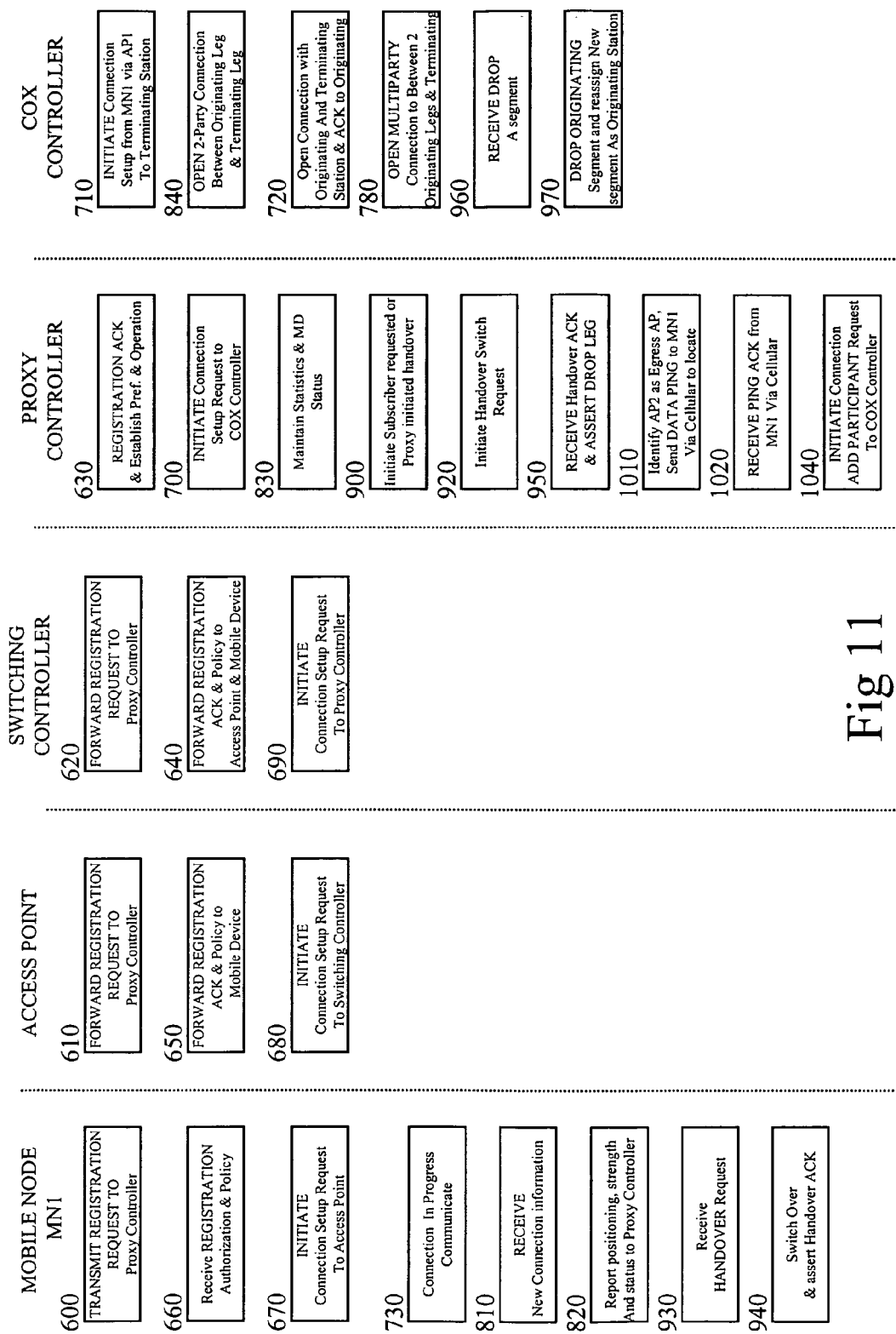
FIG. 11 is a block diagram illustrating functionality provided by the components of the distributed disparate wireless switching network, according to one embodiment.

FIG. 11 is a block diagram illustrating functionality provided by the components of the distributed disparate wireless switching network, according to one embodiment. The exemplary call flow incorporates a registration cycle between the mobile node and the proxy controller utilizing AP1. Multi segmented access first by the mobile device through AP1 and AP2. A DATA PING based registration and location by the proxy controller of the mobile device MD1. Multi-segmented access by the mobile device using AP2 and then the cellular wide-area-network. FIG. 11 provides a consolidated functional overview of each device in providing the outlined functionality.

Thus, a distributed disparate wireless switching network has been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A network architecture, comprising:
   a connection origination exchange (COX);
   a first proxy controller coupled to the COX;
   a first access point coupled to the first proxy controller; and
   a mobile node wirelessly coupled to the first access point,
   wherein the mobile node communicates with a terminating node of a network through the first access point and the first proxy controller using an identification maintained by the first proxy controller,
   wherein the COX originates a connection with the terminating node on behalf of the mobile node using the identification provided by the first proxy controller,
   wherein connection services are provided via a first connection segment between the mobile node and the COX at a first time and are provided via a second connection segment between the mobile node and the COX at a second time,
   wherein, when the mobile node moves out a coverage area of the first access point into a coverage area of a cellular network, the first proxy controller identifies the first access point as an egress access point, sends a data ping signal to the mobile node through the cellular network to locate the mobile node, and adds a participant to the connectivity maintained by the COX between the mobile node and the terminating node;
   wherein, after receiving a message from the first proxy server for adding the participant, the COX provides a multi-party conference connection between the mobile node and the terminating node to simultaneously communicate with the terminating node via the first access point and the cellular network; and
   wherein, when the mobile node becomes temporarily unavailable for a period of time within a timeout period, the COX elects to notify the terminating node of the temporary loss of communication with the mobile node, and maintains the connection to the terminating node such that the connection is not lost and is not re-originated when the mobile node becomes available within the timeout period.

2. The network architecture of claim 1, wherein the COX cooperates with the mobile node to provide virtualized origination of the connection to the terminating node over the network, and wherein the identification is a virtual subscriber identification associated with a subscriber of the mobile node.

3. The network architecture of claim 1, wherein the first proxy controller maintains a record containing preferences, localization characteristics, localization information, authentication, authorization, and accounting (AAA) information associated with a subscriber of the mobile node.

4. The network architecture of claim 3, wherein the authentication is performed using a dynamic authentication identifier associated with the subscriber that changes from time to time to provide access to the network.

5. The network architecture of claim 3, wherein the first proxy controller cooperates with the mobile node to provide AAA, network management, and network accesses to resources of the network.

6. The network architecture of claim 1, wherein connection services are provided via the first connection segment between a first subscriber of the mobile node and the COX, and wherein connection services are provided via the second connection segment between a second subscriber of the mobile node and the COX.

7. The network architecture of claim 1, wherein the COX maintains a plurality of simultaneous connections with multiple devices to an originating mobile subscriber.

8. The network architecture of claim 1, wherein the COX maintains a plurality of simultaneous connections with multiple devices to a terminating subscriber.

9. The network architecture of claim 1, wherein connection services are provided by the COX using a virtual subscriber identifier associated with a plurality of subscribers.

10. The network architecture of claim 1, further comprising a master information base to store subscriber elected preference profile and application behavioral preferences associated with types of connections when establishing a connection within the network.

11. The network architecture of claim 1, wherein the first proxy controller is coupled to a plurality of access points including the first access point and a second access point, and wherein the mobile node is able to wirelessly communicate with one or more of the access points.

12. The network architecture of claim 11, wherein the first proxy controller maintains historical and current network traffic information of the access points to provide switching functionality of the mobile node from the first access point to the second access point based on a historical likelihood of subscriber roaming.

13. The network architecture of claim 12, further comprising a second proxy controller coupled to the COX and one or more other access points, wherein the first and second proxy controllers communicate with each other regarding historical and current network traffic information of the access points.

14. The network architecture of claim 13, wherein the first and second proxy controllers exchange information regarding application behavior preferences based on subscriber elected preferences, traffic policies, quality of service, a subscriber's profile, an application's profile or a combination thereof 15. A method, comprising:

a first proxy controller communicating with a connection origination exchange (COX) and one or more access points over a wired connection;

a mobile node wirelessly communicating with at least one of the one or more access points and the mobile node communicating with a terminating node of a network through a first access point and the first proxy controller using an identification maintained by the first proxy controller; and the COX originating a connection with the terminating node on behalf of the mobile node using the identification provided by the first proxy controller, wherein connection services are provided via a first connection segment between the mobile node and the COX at a first time and are provided via a second connection segment between the mobile node and the COX at a second time, wherein, when the mobile node moves out a coverage area of the first access point into a coverage area of a cellular network, the first proxy controller identifies the first access point as an egress access point, sends a data ping signal to the mobile node through the cellular network to locate the mobile node, and adds a participant to the connectivity maintained by the COX between the mobile node and the terminating node, wherein, after receiving a message from the first proxy server for adding the participant the COX provides a multi-party conference connection between the mobile node and the terminating node to simultaneously communicate with the terminating node via the first access point and the cellular network; and wherein, when the mobile node becomes temporarily unavailable for a period of time within a timeout period, the COX elects to notify the terminating node of the temporary loss of communication with the mobile node, and maintains the connection to the terminating node such that the connection is not lost and is not re-originated when the mobile node becomes available within the timeout period.

16. An apparatus, comprising:

means for a first proxy controller communicating with a connection origination exchange (COX) and one or more access points over a wired connection;

means for a mobile node wirelessly communicating with at least one of the one or more access points and the mobile node communicating with a terminating node of a network through a first access point and the first proxy controller using an identification maintained by the first proxy controller; and means for the COX originating a connection with the terminating node on behalf of the mobile node using the identification provided by the first proxy controller, wherein connection services are provided via a first connection segment between the mobile node and the COX at a first time and are provided via a second connection segment between the mobile node and the COX at a second time, wherein, when the mobile node moves out a coverage area of the first access point into a coverage area of a cellular network, the first proxy controller identifies the first access point as an egress access point, sends a data ping signal to the mobile node through the cellular network to locate the mobile node, and adds a participant to the connectivity maintained by the COX between the mobile node and the terminating node, wherein, after receiving a message from the first proxy server for adding the participant the COX provides a multi-party conference connection between the mobile node and the terminating node to simultaneously communicate with the terminating node via the first access point and the cellular network; and wherein, when the mobile node becomes temporarily unavailable for a period of time within a timeout period, the COX elects to notify the terminating node of the temporary loss of communication with the mobile node, and maintains the connection to the terminating node such that the connection is not lost and is not re-originated when the mobile node becomes available within the timeout period.

* * * * *